(12) United States Patent
Zhang et al.

(10) Patent No.: US 9,972,036 B2
(45) Date of Patent: May 15, 2018

(54) POWER SUPPLY AND DEMAND CONTROL METHOD, POWER SUPPLY AND DEMAND CONTROL DEVICE

(71) Applicant: Panasonic Intellectual Property Management Co., Ltd., Osaka (JP)

(72) Inventors: Wei Zhang, Osaka (JP); Satoshi Tsujimura, Hyogo (JP); Takahiro Sugimoto, Kyoto (JP); Masami Funakura, Osaka (JP); Tatsuya Mizobata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 591 days.

(21) Appl. No.: 14/637,421

(22) Filed: Mar. 4, 2015

(65) Prior Publication Data
US 2015/0261239 A1  Sep. 17, 2015

(30) Foreign Application Priority Data
Mar. 14, 2014 (JP) ................ 2014-051699

(51) Int. Cl.
| | | |
|---|---|---|
| *G05D 3/12* | (2006.01) | |
| *G05D 5/00* | (2006.01) | |
| *G05D 9/00* | (2006.01) | |
| *G05D 11/00* | (2006.01) | |
| *G06Q 30/02* | (2012.01) | |
| *G06Q 30/08* | (2012.01) | |
| *G06Q 50/06* | (2012.01) | |

(52) U.S. Cl.
CPC ......... *G06Q 30/0284* (2013.01); *G06Q 30/08* (2013.01); *G06Q 50/06* (2013.01)

(58) Field of Classification Search
CPC ..... G06Q 30/0284; G06Q 30/08; G06Q 50/06
USPC ........................................... 700/291
See application file for complete search history.

(56) References Cited

U.S. PATENT DOCUMENTS

| | | | | |
|---|---|---|---|---|
| 7,839,027 B2* | 11/2010 | Shelton | ..... | H02J 3/32 307/102 |
| 9,685,799 B2* | 6/2017 | Kaji | ..... | H02J 7/0029 |
| 2013/0229149 A1* | 9/2013 | Sortomme | ..... | H02J 7/00 320/109 |

(Continued)

FOREIGN PATENT DOCUMENTS

| | | |
|---|---|---|
| JP | 2006-094648 A | 4/2006 |
| JP | 2013-169069 A | 8/2013 |
| WO | 2013/046657 | 4/2013 |

*Primary Examiner* — Ziaul Karim
(74) *Attorney, Agent, or Firm* — Greenblum & Bernstein, P.L.C.

(57) ABSTRACT

A power supply and demand control method for a power storage system includes predicting a consumption power of a customer for each of time slots divided by a specific time interval, assigning one of a frequency control or a peak shaving control to each of the time slots based on the predicted consumption power, controlling the storage battery based on the assigned frequency control or the assigned peak shaving control in each of the time slots, wherein the peak shaving control is assigned to each of the time slots in which the predicted consumption power is higher than a contract power, and the frequency control is assigned to each of the times slot in which the predicted consumption power is equal to or lower than the contract power.

15 Claims, 17 Drawing Sheets

(56) References Cited

U.S. PATENT DOCUMENTS

| | | | |
|---|---|---|---|
| 2014/0114829 A1* | 4/2014 | Forbes, Jr. | G05D 17/00 705/35 |
| 2014/0184170 A1* | 7/2014 | Jeong | B60L 11/184 320/137 |
| 2014/0266054 A1* | 9/2014 | Faries | H02J 3/32 320/128 |
| 2015/0142187 A1* | 5/2015 | Yamane | H02J 3/12 700/286 |

* cited by examiner

POWER SUPPLY AND DEMAND CONTROL METHOD, POWER SUPPLY AND DEMAND CONTROL DEVICE

BACKGROUND

1. Technical Field

The present disclosure relates to a power supply and demand control method and a power supply and demand control device that use a power storage system to perform peak shaving for a customer and frequency control of a power system.

2. Description of the Related Art

In recent years, a system or the like that uses a storage battery system (power storage system) to perform frequency control of a power system and peak shaving for a customer has been discussed.

In related art, for example, International Publication No. 2013/046657 discloses a technology that controls discharge of a storage battery in order to reduce consumption power by peak shaving. A control device disclosed in International Publication No. 2013/046657 supplies power to a load by allowing the storage battery to perform discharge so that consumption power by the load does not exceed prescribed contract power. That is, the control device performs peak shaving for the customer. Further, the control device charges the storage battery after the peak shaving and then enters the frequency control.

SUMMARY

However, in consideration of incentives or the like that may be obtained, there is room for further discussion about a method of efficiently practicing peak shaving and frequency control.

One non-limiting and exemplary embodiment provides a supply and demand control method that efficiently conducts peak shaving and frequency control.

In one general aspect, the techniques disclosed here feature a power supply and demand control method for a power storage system includes predicting a consumption power of a customer for each of time slots divided by a specific time interval, assigning one of a frequency control or a peak shaving control to each of the time slots based on the predicted consumption power; controlling the storage battery based on the assigned frequency control or the assigned peak shaving control in each of the time slots, wherein the peak shaving control is assigned to each of the time slots in which the predicted consumption power is higher than a contract power, and the frequency control is assigned to each of the times slot in which the predicted consumption power is equal to or lower than the contract power.

A power supply and demand control method of the present disclosure allows peak shaving and frequency control to be efficiently and easily conducted.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
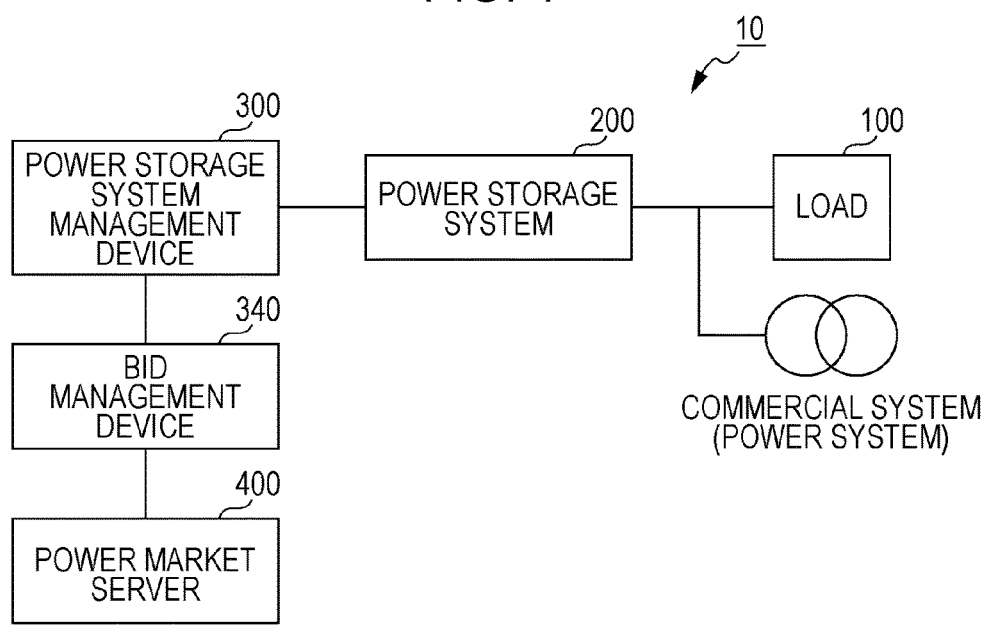
FIG. 1 is a block diagram that illustrates a system configuration of a supply and demand control system according to a first embodiment.

A power supply and demand control method according to one aspect of the present disclosure is a power supply and demand control method for a power storage system includes predicting a consumption power of a customer for each of time slots divided by a specific time interval, assigning one of a frequency control or a peak shaving control to each of the time slots based on the predicted consumption power; controlling the storage battery based on the assigned frequency control or the assigned peak shaving control in each of the time slots, wherein the peak shaving control is assigned to each of the time slots in which the predicted consumption power is higher than a contract power, and the frequency control is assigned to each of the times slot in which the predicted consumption power is equal to or lower than the contract power.

Further, the power supply and demand control method may further include performing a bid for the frequency control before a bid deadline.

Further, the power supply and demand control method may further include: cancelling the bid by a bid deadline in a case where the peak shaving control is assigned to the time slot.

Further, the power supply and demand control method may further include estimating a state of charge of the power storage system in each of the time slots, wherein the frequency control is assigned to each of the time slots in which the predicted power consumption is equal to or lower than the contract power and the estimated state of charge is within a prescribed range, and a charge control is assigned to each of the time slots in which the predicted power consumption is equal to or lower than the contract power and the estimated state of charge is lower than a prescribed range.

Further, a charge amount in the time slots assigned the charge control may be equal to or higher than a difference between consumption power and the contract power in the slots.

Further, in a case where the state of charge is not kept within the prescribed range within a range of the contract power in the time slots assigned charge control, the charge control is successively assigned to each of later time slots until the state of charge becomes within the prescribed range.

Further, in a case where the consumption power in next time slots is predicted to become equal to or lower than the contract power, the frequency control is assigned to each of the next time slots.

Further, in a case where the peak shaving control is executed, a power amount that is equivalent to a discharge amount of the peak shaving control in the earlier time slots is charged to the power storage system by using one or more slots assigned the charge control.

Further, in a case where the peak shaving control is assigned to the time slot and the peak shaving control is completed by an end time of the time slot, the charge control of the power storage system is started in a period of the time slot.

Further, in a case where the peak shaving control is not completed by using earlier time slots than the slots assigned the charge control, the peak shaving control is continued by using one or more slots assigned the charge control, and the peak shaving is switched to the charge control when the peak shaving is completed.

Further, at a start time of the time slot assigned frequency control, charge and discharge of the power storage system is performed by using one or more slots assigned charge control to keep the state of charge of the power storage system within the prescribed range.

Further, in a case where the consumption power of the customer is predicted to exceed the contract power in the slots assigned charge control by performing charge until the state of charge of the power storage system becomes within the prescribed range, a load that belongs to the customer is stopped.

Further, in a case where the consumption power of the customer is predicted to exceed the contract power in the slots assigned charge control by performing charge until the state of charge of the power storage system becomes within the prescribed range, a plan in which a higher incentive is obtained is selected from (i) a plan in which a charge amount is reduced so that the consumption power of the customer in the slots assigned charge control is lower than the contract power and the charge control is assigned to the next time slot and (ii) a plan in which charge is performed in the slots assigned charge control until the state of charge of the power storage system becomes within the prescribed range and the frequency control is assigned to the next time slot.

Further, the peak shaving control is performed by using the time slot to which the peak shaving control is assigned, supplying power from the power storage system to the load that belongs to the customer, and regulating or stopping the load that belongs to the customer.

A power supply and demand control device according to one aspect of the present disclosure is a power supply and demand control device for a power storage system, includes: one or more memories; and circuitry operative to: predict a consumption power of a customer for each of time slots divided by a specific time interval; assign one of a frequency control or a peak shaving control to each of the time slots based on the predicted consumption power; and control the storage battery based on the assigned frequency control or the assigned peak shaving control in each of the time slots, wherein the peak shaving control is assigned to each of the time slots in which the predicted consumption power is higher than a contract power, and the frequency control is assigned to each of the times slot in which the predicted consumption power is equal to or lower than the contract power.

A power storage system according to one aspect of the present disclosure is a power storage system that is connected via a communication network with a power supply and demand control device that controls power supply and demand between a power system and a customer, the power storage system including: one or more storage batteries; a frequency detector that detects a frequency of the power system; a command value generator that generates a first power command value that indicates power to be charged to or discharged from the storage batteries to control the frequency of the power system based on a frequency that is detected by the frequency detector; a communicator that communicates with the supply and demand control device; and a charge-discharge controller that, for each of time slots that are divided by a specific time unit, (i) performs charge-discharge control of the storage batteries based on the first power command value in a case where a first control signal that indicates an instruction of the frequency control is received from the supply and demand control device by a specific time before a start time of the time slot and (ii) performs the charge-discharge control of the power storage system based on a second power command value in a case where the first control signal is not received from the supply and demand control device by a specific time before the start time of the time slot and a second control signal that contains the second power command value that is a command value to control charge and discharge of the storage batteries is received.

Further, the charge-discharge controller may perform the peak shaving in the time slot by receiving, from the power supply and demand control device, the second power command value that contains a discharge command value in a period of the time slot.

Further, a cycle of detection of the frequency that is executed by the frequency detector and a cycle of generation of the first power command value that is executed by the command value generator may be shorter cycles than a reception cycle of the second power command value.

It should be noted that these general and specific aspects may be implemented as a system, a device, an integrated circuit, computer program, a recording medium, or any selective combination thereof.

Embodiments will hereinafter be described in detail with reference to drawings.

It should be noted that all the embodiments described below illustrate general or specific examples. Values, shapes, materials, elements, arrangement positions or connection manners of elements, steps, orders of steps, and so forth that are described in the following embodiments are merely illustrative and are not intended to limit the present disclosure. Further, the elements that are not described in the independent claims that provide the most superordinate concepts among the elements in the following embodiments will be described as optional elements.

First Embodiment

[System Configuration]

A configuration of a power supply and demand control system according to a first embodiment will first be described. FIG. 1 is a block diagram that illustrates a system configuration of the power supply and demand control system according to the first embodiment.

As illustrated in FIG. 1, a power supply and demand control system 10 includes a load 100, a power storage system 200, a power storage system management device 300 (supply and demand control device), a bid management device 340, and a power market server 400.

The load 100 is an electric apparatus that operates by using power such as an air conditioner installed in a customer, for example.

The power storage system 200 is a device that has a function of charging and discharging power and is installed in the customer, for example. Specifically, the power storage system 200 is a storage battery system that uses a secondary battery (storage battery) such as a lead battery, a lithium-ion battery, or a redox flow battery. A flywheel or pumping generator may be used as the power storage system 200 instead of the storage battery.

The power storage system management device 300 controls the power storage system 200 to perform frequency control (which may be denoted as FR control in the drawings) of a power system and peak shaving for the customer. The first embodiment is characterized in a point that the power storage system management device 300 assigns control contents to time slots in advance in order to efficiently perform the frequency control and the peak shaving. The control contents will be described in detail below.

The bid management device 340 is a device that performs a bid for the frequency control that is planned to be conducted in the time slot to the power market server 400 (frequency regulation market) after the frequency control is assigned to the time slot and before a prescribed bid deadline time. The bid deadline time is in general defined for each of the time slots, for example, 65 minutes before a target time slot.

The power market server 400 manages bid information to the frequency regulation market. The power market server 400 is managed by a system operator that manages the frequency regulation market, for example.

[Outline of Control Contents]

Figure 2:
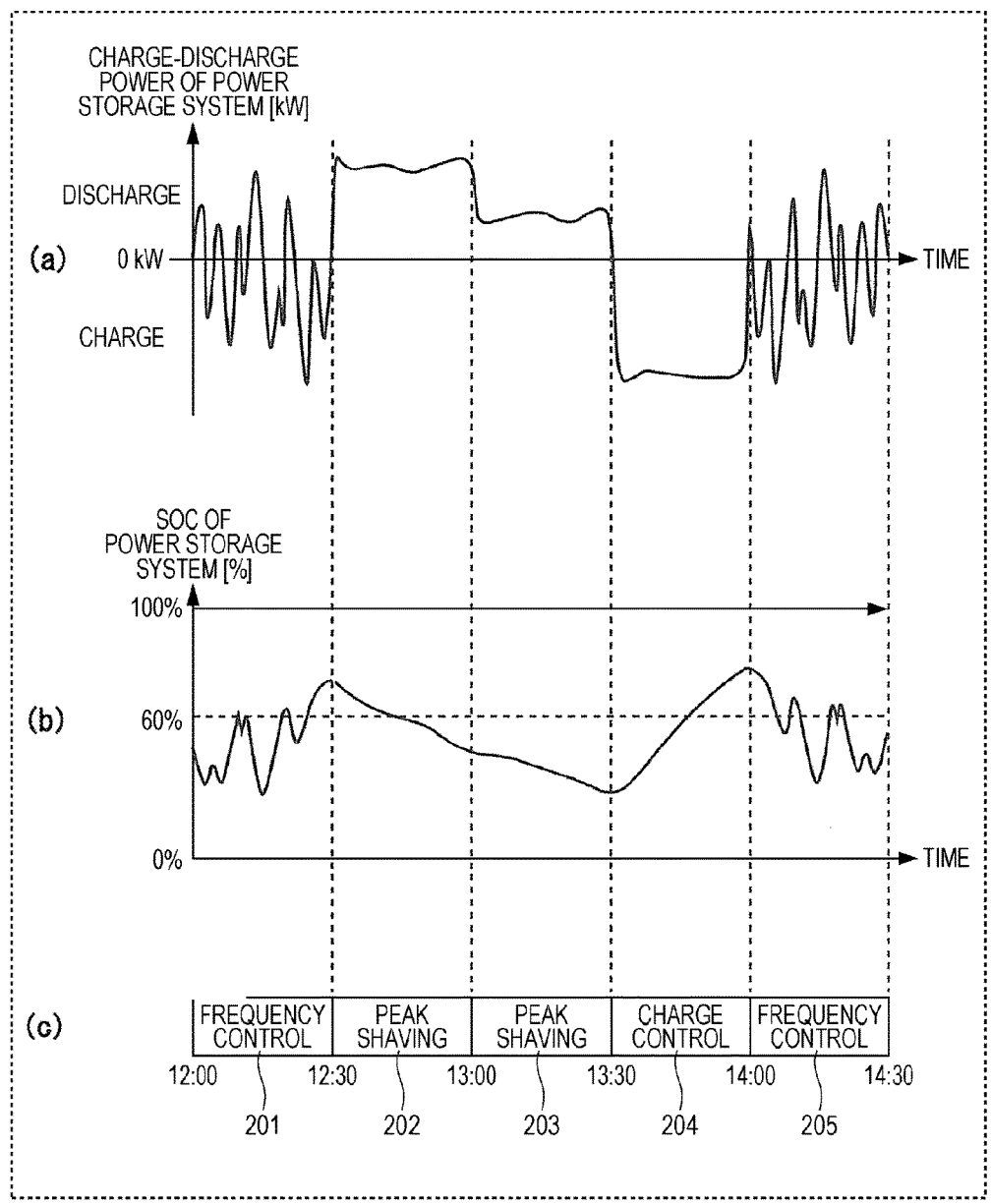
FIG. 2 is a diagram for explaining control contents that are assigned to time slots.

Here, a description will be made about the control contents that are assigned to the time slots in advance by the power storage system management device 300. FIGS. 2(a) to 2(c) are diagrams for explaining the control contents that are assigned to the time slots. FIG. 2(a) is a diagram that illustrates a time change in the amount of charge or discharge that the power storage system 200 performs between the power storage system 200 and the power system. FIG. 2(b) is a diagram that illustrates a time change in a state of charge (SOC) of the power storage system 200. FIG. 2(c) is a diagram that illustrates the control contents assigned to the time slots.

In the first embodiment, the power storage system management device 300 assigns the frequency control, the peak shaving, and charge control to the time slot. The control contents may include control other than those.

The frequency control is control that causes the power storage system 200 to perform charge or discharge (charge or discharge between the power storage system 200 and a commercial system) in accordance with a command value in order to keep an alternate current frequency of the commercial system (power system) within a prescribed range. The frequency control is assigned to a time slot 201 (from 12:00 to 12:30) and a time slot 205 (from 14:00 to 14:30) that are illustrated in FIG. 2(c).

In the frequency control, the power storage system management device 300 causes the power storage system 200 to perform charge or discharge in accordance with a command value that is generated for each second, for example. Thus, as illustrated in FIGS. 2A and 2B, a charge-discharge amount and the SOC rapidly change in the time slots 201 and 205 in which the frequency control is performed.

The peak shaving is control to reduce the consumption power of the load 100 so that the consumption power of the customer is prescribed contract power or lower. The peak shaving is assigned to a time slot 202 (from 12:30 to 13:00) and a time slot 203 (from 13:00 to 13:30) that are illustrated in FIG. 2(c).

It should be noted that the consumption power means the consumption of power from the commercial system unless otherwise mentioned. The consumption power exceeding prescribed contract power leads to disadvantages such as an increase in a power rate.

In the peak shaving, the power storage system management device 300 typically supplies power that is charged in the power storage system 200 to the load 100 to operate the load 100, thereby reducing the consumption power. Thus, as illustrated in FIGS. 2A and 2B, the power storage system 200 performs discharge, and the SOC decreases in the time slots 202 and 203 in which the peak shaving is performed.

The charge control is control to charge power from the commercial system to the power storage system 200. The charge control is assigned to a time slot 204 (from 13:30 to 14:00) that is illustrated in FIG. 2(c). Thus, as illustrated in FIGS. 2A and 2B, the power storage system 200 is charged, and the SOC increases in the time slot 204 in which the charge control is performed.

[Outline of Frequency Control Service]

Among the control contents, the frequency control is performed as a frequency control service based on a contract with a company that runs a power supply and demand adjustment project. An outline of the frequency control service will be described below. As illustrated in FIGS. 2A to 2C, it is assumed that a frequency adjustment period is divided into plural time slots (time units). The frequency adjustment period is a time zone for which the company running the power supply and demand adjustment project desires provision of the frequency control service.

In a case where the power storage system management device 300 determines to perform the frequency control in a target time slot, the bid management device 340 performs a bid to the power market server 400 at a time earlier than a start time of the target time slot. If the power market server 400 accepts the bid, the power market server 400 transmits a signal that indicates a successful bid to the bid management device 340.

When the frequency of the commercial system deviates from a prescribed allowable range in the frequency adjustment period that corresponds to the successful bid, the power storage system management device 300 causes the power storage system 200 to perform charge or discharge and thereby reduces fluctuations in the frequency of the commercial system. Accordingly, an aggregator that is a holder of the power storage system management device 300 (power storage system 200) may obtain incentives from the company running the power supply and demand adjustment project.

[Function Configurations of Devices]

A description will next be made about function configurations of the power storage system management device 300 and the bid management device 340.

Figure 3:
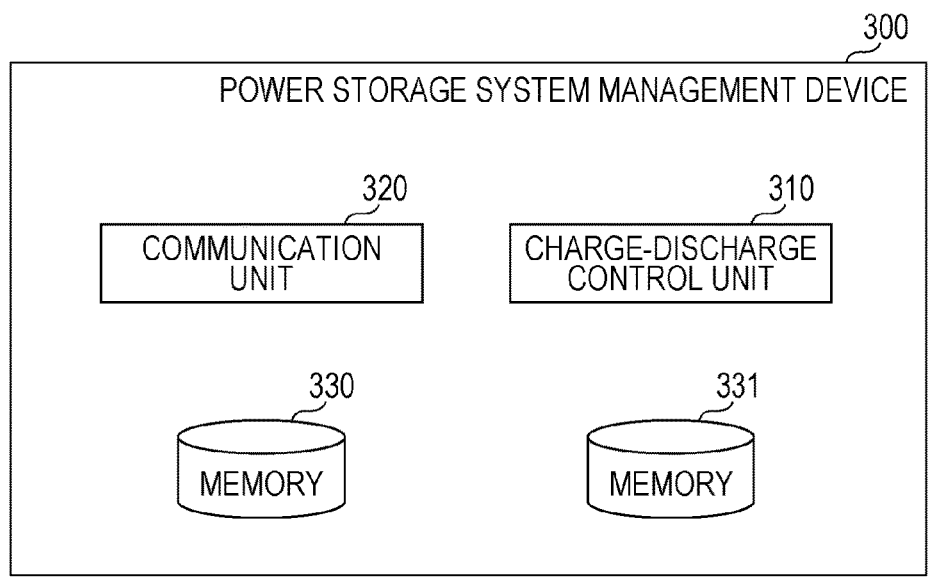
FIG. 3 is a function block diagram of a power storage system management device.

The function configuration of the power storage system management device 300 will first be described. FIG. 3 is a function block diagram of the power storage system management device 300.

The power storage system management device 300 includes a charge-discharge control unit 310 (control unit), a communication unit 320, a memory 330, and a memory 331.

The communication unit 320 communicates with the bid management device 340. Further, the communication unit 320 communicates with the power storage system 200. A communication network that is used for communication with the bid management device 340 may be a communication network different from a communication network that is used for communication with the power storage system 200. Further, the communication unit 320 may configure two separate communication units that correspond to the bid management device 340 and the power storage system 200. Specifically, the communication unit 320 is a communication module or the like, for example.

The charge-discharge control unit 310 controls charge and discharge of the power storage system 200. Specifically, the charge-discharge control unit 310 generates a command value to control charge or discharge of the power storage system 200 and transmits the command value to the power storage system 200. The power storage system 200 performs charge or discharge based on the command value.

Figure 4:
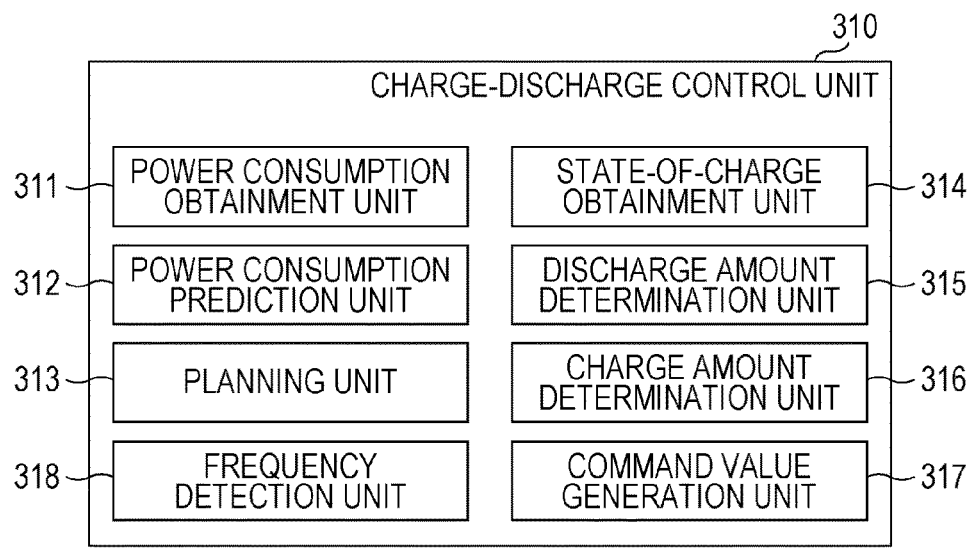
FIG. 4 is a block diagram that illustrates a function configuration of a charge-discharge control unit.

A specific configuration of the charge-discharge control unit 310 will be described below with reference to FIG. 4. FIG. 4 is a block diagram that illustrates a function configuration of the charge-discharge control unit. It should be noted that the configuration illustrated in FIG. 4 is one example.

As illustrated in FIG. 4, the charge-discharge control unit 310 has a consumption power obtainment unit 311, a consumption power prediction unit 312 (prediction unit), a planning unit 313, a state-of-charge obtainment unit 314, a discharge amount determination unit 315, a charge amount determination unit 316 (estimation unit), and a command value generation unit 317.

The consumption power obtainment unit 311 obtains consumption power of the customer. In other words, the consumption power obtainment unit 311 obtains an amount of power from the commercial system that is consumed by the load 100 that belongs to the customer. Information about the consumption power of the customer that is obtained by the consumption power obtainment unit 311 is stored in the memory 330 as a consumption power history.

The consumption power prediction unit 312 predicts consumption power of the customer based on the consumption power that is obtained in the past (consumption power history).

The planning unit 313 assigns one of the control contents that include at least the frequency control and the peak shaving to the time slot based on the predicted consumption power. An assignment method of the control contents of the planning unit 313 will be described in detail below.

The state-of-charge obtainment unit 314 obtains information about the state of charge of the power storage system 200 (for example, from the power storage system 200). The information about the state of charge of the power storage system 200 that is obtained by the state-of-charge obtainment unit 314 is stored in the memory 331 as a state-of-charge history.

A frequency detection unit 318 detects the frequency of the commercial system. The frequency detection unit 318 may be provided in the power storage system 200. Further, another device for frequency detection may perform the frequency detection. In this case, the power storage system management device 300 has a frequency obtainment unit, and the frequency obtainment unit obtains information about the frequency that is detected by the other device.

The discharge amount determination unit 315 determines a discharge amount of the power storage system 200 in the peak shaving in a case where the consumption power is predicted to exceed a prescribed contract power.

The charge amount determination unit 316 estimates the state of charge of the power storage system 200 in a future time slot based on state-of-charge information that is stored in the memory 331. Further, the charge amount determination unit 316 determines a charge amount that is needed to return the state of charge of the power storage system 200 to a prescribed range. The prescribed range herein is stored as reference SOC information in the memory 331 and serves as a determination reference of whether or not the frequency control is executable.

The prescribed range of the state of charge is defined as, for example, "the range where the SOC is 20% or higher to 80% or lower". This is because both of charge and discharge are performed in the frequency control and thus neither a case where the state of charge of the power storage system 200 is too high nor a case where the state of charge of the power storage system 200 is too low is suitable for the frequency control.

Further, in general, in the bid for the frequency control service, the larger power that is usable for the frequency control provides the more incentives. Thus, it may be said that the most idealistic SOC in a start of the frequency control is 50%.

The command value generation unit 317 generates a command value to cause the power storage system 200 to perform charge or discharge. The command value generation unit 317 generates a command value for performance of the frequency control based on frequency information that is obtained by the frequency obtainment unit (hereinafter referred to as FR command value also), for example. Further, the command value generation unit 317 generates command values for the peak shaving and the charge control.

Figure 5:
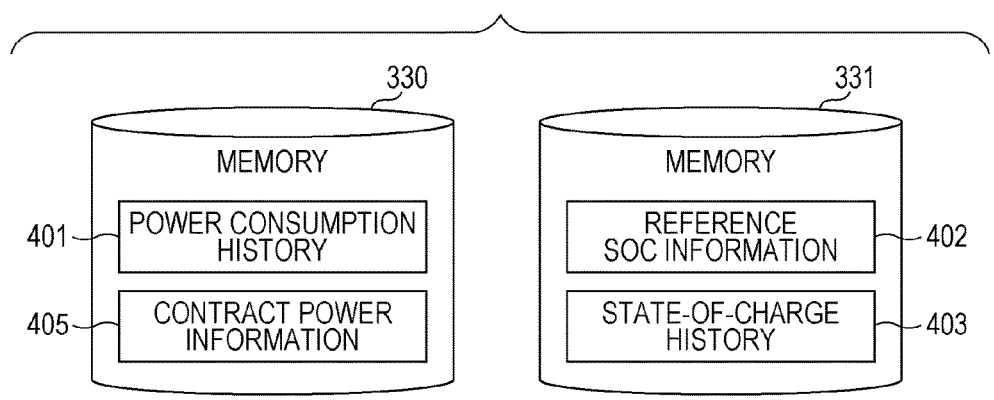
FIG. 5 is a diagram that illustrates memory configurations of memories that are provided in the power storage system management device.

The memory 330 and the memory 331 will next be described. FIG. 5 is a diagram that illustrates memory configurations of the memory 330 and the memory 331. It should be noted that the memory configurations illustrated in FIG. 5 are examples.

Specifically, the memory 330 and the memory 331 (and a memory 332 that will be described below) are recording media such as a semiconductor memory such as a flash memory, a ferroelectric memory, and a hard disk drive (HDD), for example.

The memory 330 is mainly used for the prediction of the consumption power. The memory 330 stores a consumption power history 401 and contract power information 405.

The memory 331 is mainly used for the prediction of the state of charge. The memory 331 stores reference SOC information 402 and a state-of-charge history 403.

The consumption power history 401 is a history of the consumption power that is obtained by the consumption power obtainment unit 311.

The contract power information 405 is information about the prescribed contract power that is defined by a contract with a management company (power company) of the commercial system. As described above, the consumption power exceeding the prescribed contract power leads to disadvantages such as an increase in the power rate.

Information about the state of charge that serves as the reference in the frequency control is stored in the reference SOC information 402. The reference SOC information 402 may be stored in the power storage system management device 300 in advance or may be updated at each time.

The state-of-charge history 403 is a history of the state of charge (information about the state of charge) of the power storage system 200 that is obtained by the state-of-charge obtainment unit 314.

Figure 6:
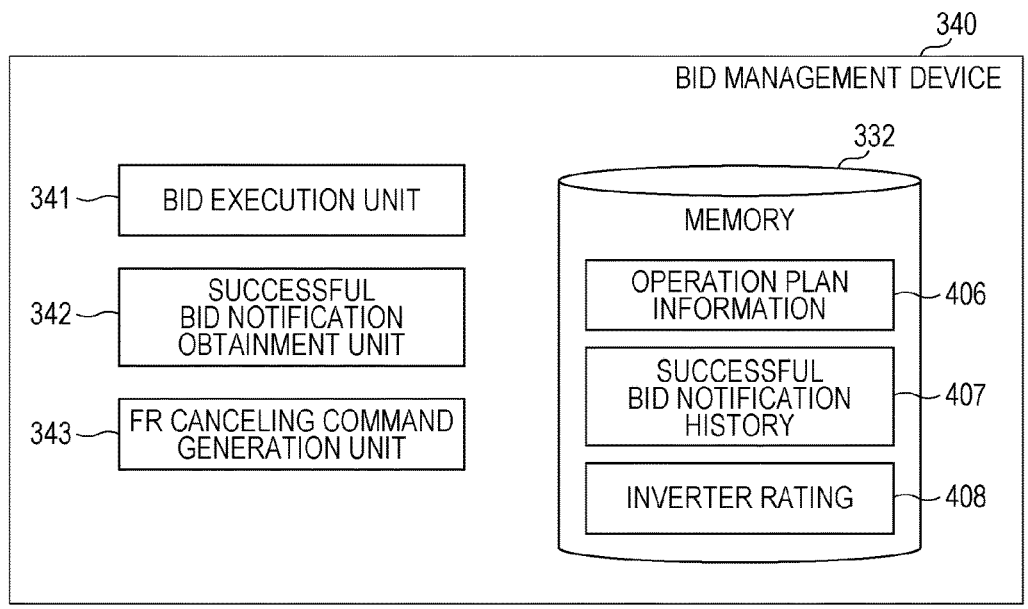
FIG. 6 is a block diagram that illustrates a function configuration of a bid management device.

A configuration of the bid management device 340 will next be described. FIG. 6 is a block diagram that illustrates a function configuration of the bid management device 340.

As illustrated in FIG. 6, the bid management device 340 includes a bid execution unit 341, a successful bid notification obtainment unit 342, and a FR canceling command generation unit 343.

The bid execution unit 341 transmits the bid information to the power market server 400. That is, the bid execution unit 341 performs a bid for the frequency control to the frequency regulation market.

The successful bid notification obtainment unit 342 obtains a successful bid notification from the power market server 400.

The FR canceling command generation unit 343 generates a canceling command of the frequency control of the power storage system 200 in a case where an already scheduled bid for the frequency control is not accepted and the successful bid notification is not provided.

The memory 332 stores an operation plan information 406, a successful bid notification history 407, and an inverter rating 408.

The operation plan information 406 is information that indicates the control content of a future time slot to which the control content is already assigned.

The successful bid notification history 407 is a history of the successful bid notifications that are obtained by the successful bid notification obtainment unit 342.

The inverter rating 408 is information about the rating of an inverter that is provided in the power storage system 200 to convert alternate current power of the commercial system into direct current power. The inverter rating 408 defines the maximum value of charge and discharge of the power storage system 200. The inverter rating may be used as a bid value of the frequency control (the power that is usable for the frequency control for which the bid is made).

The bid management device 340 may be provided in the power storage system management device 300. That is, the bid management device 340 may be realized as a function (bid management unit) of the power storage system management device 300.

[Operation of Whole Supply and Demand Control System]

Figure 7:
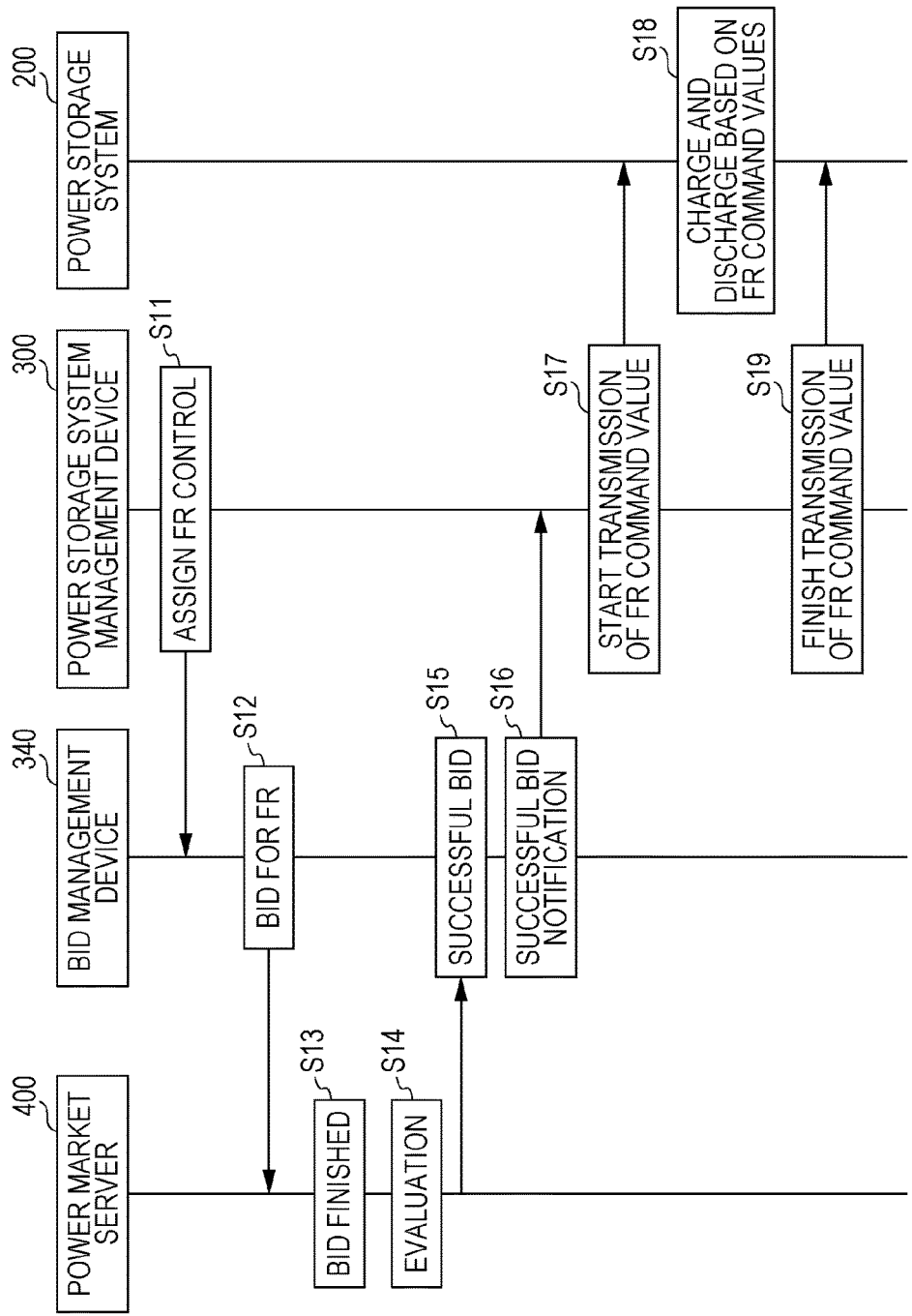
FIG. 7 is a sequence diagram in a case where frequency control is assigned to a target time slot.

An operation of the whole supply and demand control system 10 will next be described. An operation in a case where the frequency control is assigned to a target time slot will first be described with reference to FIG. 7. FIG. 7 is a sequence diagram in a case where the frequency control is assigned to a target time slot.

As illustrated in FIG. 7, in a case where the power storage system management device 300 assigns the frequency control to a target time slot (S11), the bid management device 340 performs a bid for the frequency control service (S12). Here, the power storage system management device 300 notifies the bid management device 340 that the frequency control is assigned to the target time slot. In a case where no notification is provided from the power storage system management device 300 by a prescribed bid deadline time for the target time slot, the bid management device 340 may determine that the frequency control is assigned to the target time slot.

In a case where the bid is finished in the frequency regulation market (the power market server 400) (S13), the content of the bid is evaluated (S14), and in a case where the bid is successful for the frequency control service (S15), the bid management device 340 obtains the successful bid notification (S16). As a result, the power storage system management device 300 starts transmission of the FR command value to the power storage system 200 at the start time of the target time slot (S17). The FR command value is transmitted for each prescribed time (for example, for each second). Here, the end time of the target time slot is also notified.

The power storage system 200 performs charge and discharge based on the FR command values between the power storage system 200 and the commercial system (S18). The charge and discharge based on the FR command values are performed until transmission of the FR command values is finished (S19).

Figure 8:
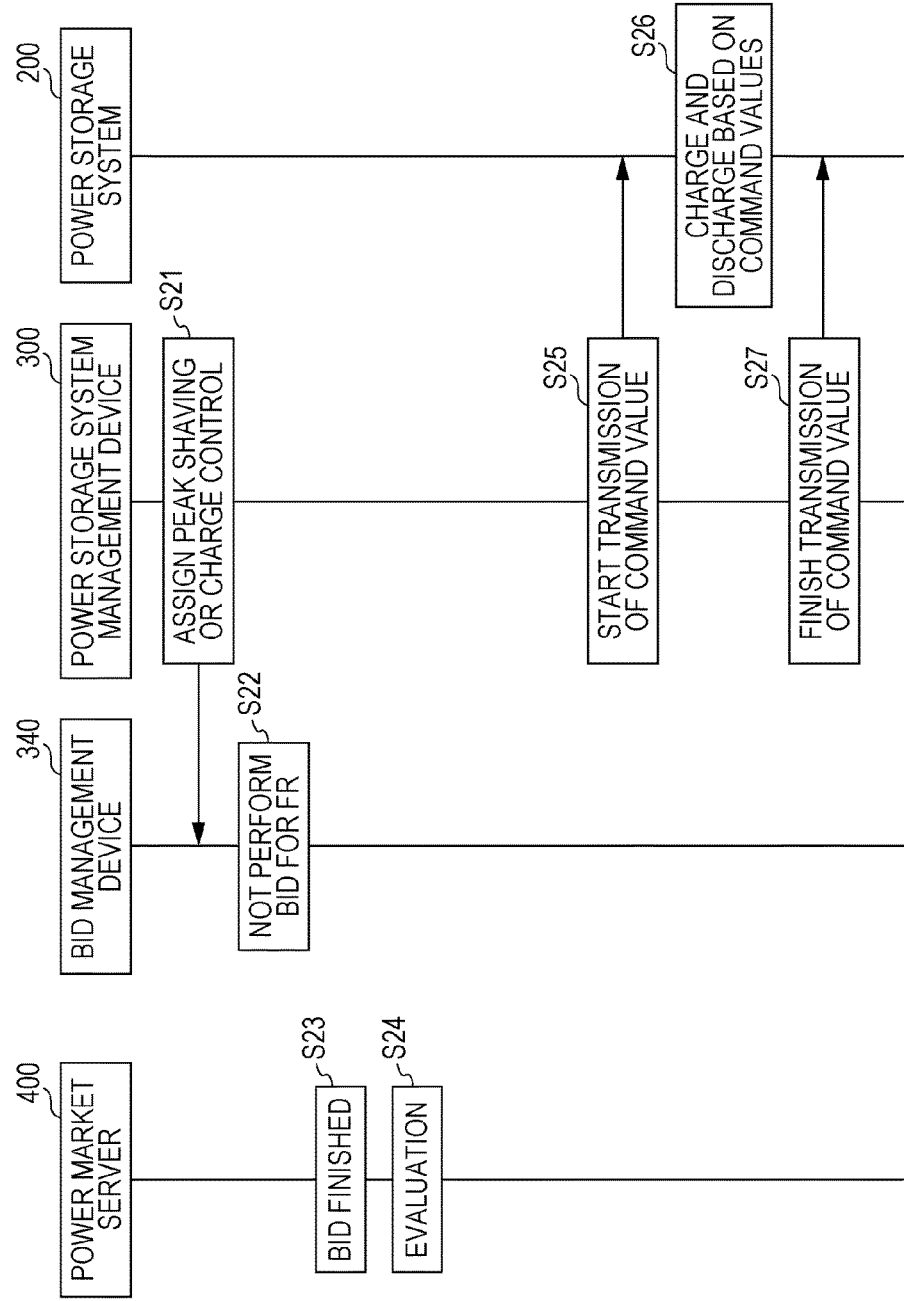
FIG. 8 is a sequence diagram in a case where peak shaving or charge control is assigned to a target time slot.

An operation in a case where the peak shaving or the charge control is assigned to a target time slot will next be described. FIG. 8 is a sequence diagram in a case where the peak shaving or the charge control is assigned to a target time slot.

As illustrated in FIG. 8, in a case where the power storage system management device 300 assigns the peak shaving or the charge control to a target time slot (S21), the bid management device 340 does not perform a bid for the frequency control service (S22). In the frequency regulation market (the power market server 400), the bid is finished (S23), the content of the bid is evaluated (S24).

As a result, the power storage system management device 300 starts transmission of the command value for the peak shaving or the command value for the charge control to the power storage system 200 at the start time of the target time slot (S25). The command value for the peak shaving or the charge control is transmitted for each prescribed time (for example, for each five minutes). Here, the end time of the target time slot is also notified.

The power storage system 200 performs charge and discharge based on the command values between the power storage system 200 and the commercial system (S26). The charge and discharge based on the command values are performed until transmission of the command values is finished (S27).

[Operation of Power Storage System Management Device]

An operation of the power storage system management device 300 will next be described.

Figure 9:
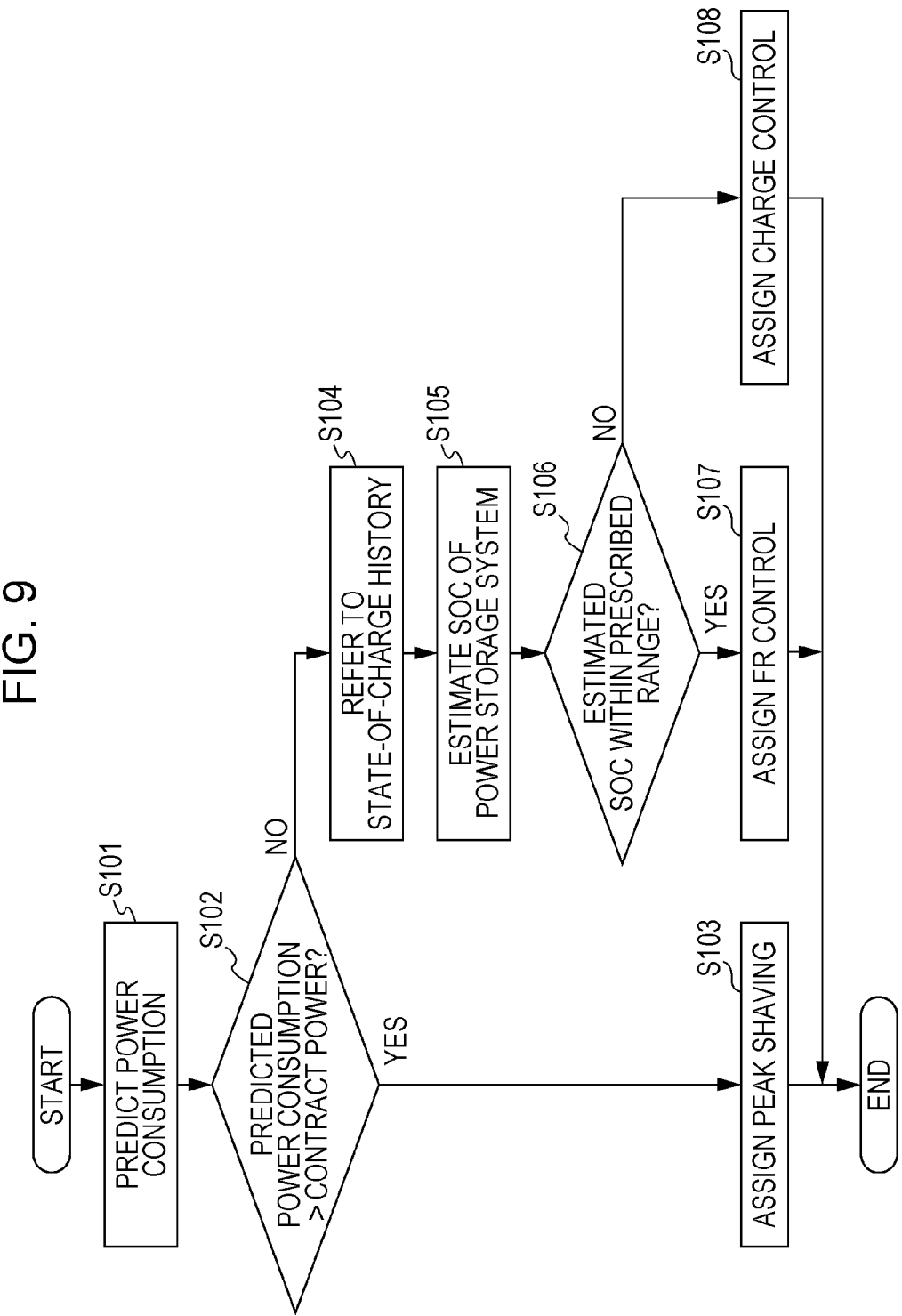
FIG. 9 is a flowchart of an assignment operation of control contents of the power storage system management device.

An assignment operation of the control contents of the power storage system management device 300 will first be described. FIG. 9 is a flowchart of the assignment operation of the control contents of the power storage system management device 300.

The power storage system management device 300 determines the control contents that are planned to be conducted in the respective time slots with respect to the time slots contained in a frequency control period by a prescribed time before the respective time slots. As described above, the control contents include the frequency control, peak shaving control, and the charge control.

The consumption power prediction unit 312 of the power storage system management device 300 first predicts consumption power of the customer in a target time slot (S101). This prediction is performed based on the consumption power history 401.

The planning unit 313 of the power storage system management device 300 refers to contract power information in the memory 330 and thereby determines whether or not the predicted consumption power exceeds a prescribed contract power (S102). The determination in this case is actually performed based on a power amount in a time unit for a determination. That is, the consumption power and the contract power are not limited to instantaneous power.

In a case where the consumption power is higher than the prescribed contract power (Yes in S102), the planning unit 313 assigns the peak shaving to the target time slot (S103). On the other hand, in a case where the predicted consumption power is the prescribed contract power or lower (No in S102), the charge amount determination unit 316 refers to the state-of-charge history 403 in the memory 331 (S104) and estimates the state of charge of the power storage system 200 at the start time of the target time slot (S105).

The planning unit 313 next determines whether or not the estimated state of charge is within a prescribed range that is defined by the reference SOC information 402 (S106). In a case where the state of charge is within the prescribed range (Yes in S106), the planning unit 313 assigns the frequency control to the target time slot (S107). In a case where the state of charge is not within the prescribed range (No in S106), the planning unit 313 assigns the charge control to the target time slot (S108).

As described above, the power storage system management device 300 assigns the peak shaving to the time slot in which the predicted consumption power exceeds the prescribed contract power. This enables reduction in the possibility that the consumption power exceeds the prescribed contract power and reduction of occurrences of disadvantages such as an increase in the power rate.

In addition, the power storage system management device 300 assigns the frequency control to the time slot in which the predicted consumption power is the prescribed contract power or lower and the estimated state of charge is within the prescribed range. This enables efficient assignment of the frequency control to the time slot in which the frequency control is highly possibly executable.

Further, the power storage system management device 300 assigns the charge control to the time slot in which the predicted consumption power is the prescribed contract power or lower and the estimated state of charge is in the prescribed range or lower. This increases the possibility that the frequency control may be assigned to the time slot that is later than the time slot to which the charge control is assigned. As described above, because performing the frequency control provides incentives, a large advantage may be gained by efficiently assigning the frequency control to as many time slots as possible.

Further, because the bid needs to be performed in advance for the frequency control, it is useful to predict the consumption power and assign the control contents in advance, as described above.

The estimation of the state of charge is not necessarily needed. In such a case, the frequency control may be assigned to the time slot in which the predicted consumption power is the prescribed contract power or lower. Such a configuration also enables reduction in the possibility that the consumption power exceeds the prescribed contract power. That is, it may be said that the efficient peak shaving and frequency control may easily be conducted when the assignment of the control contents is performed like the power storage system management device 300.

Figure 10:
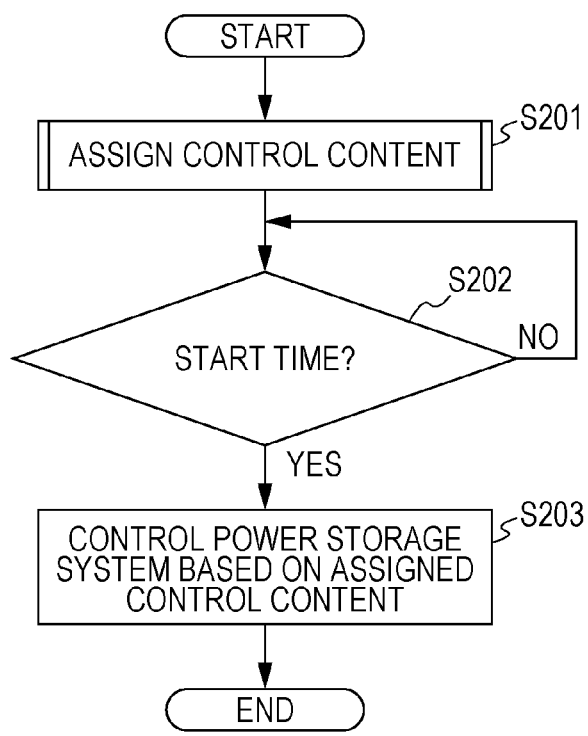
FIG. 10 is a flowchart of charge-discharge control of the power storage system management device.

Charge-discharge control of the power storage system management device 300 will next be described. FIG. 10 is a flowchart of the charge-discharge control of the power storage system management device 300.

The planning unit 313 first performs the assignment of the control contents (S201). An assignment operation of the control contents is similar to the operation that is illustrated by the flowchart of FIG. 9.

At the start time of the time slot (Yes in S202), the command value generation unit 317 next causes the power storage system 200 to perform charge or discharge based on the control content that is assigned to the time slot (S203). The charge-discharge control may not be performed along a plan that is arranged by the planning unit 313. Such a case will be described below.

[Operation of Bid Management Device]

Figure 11:
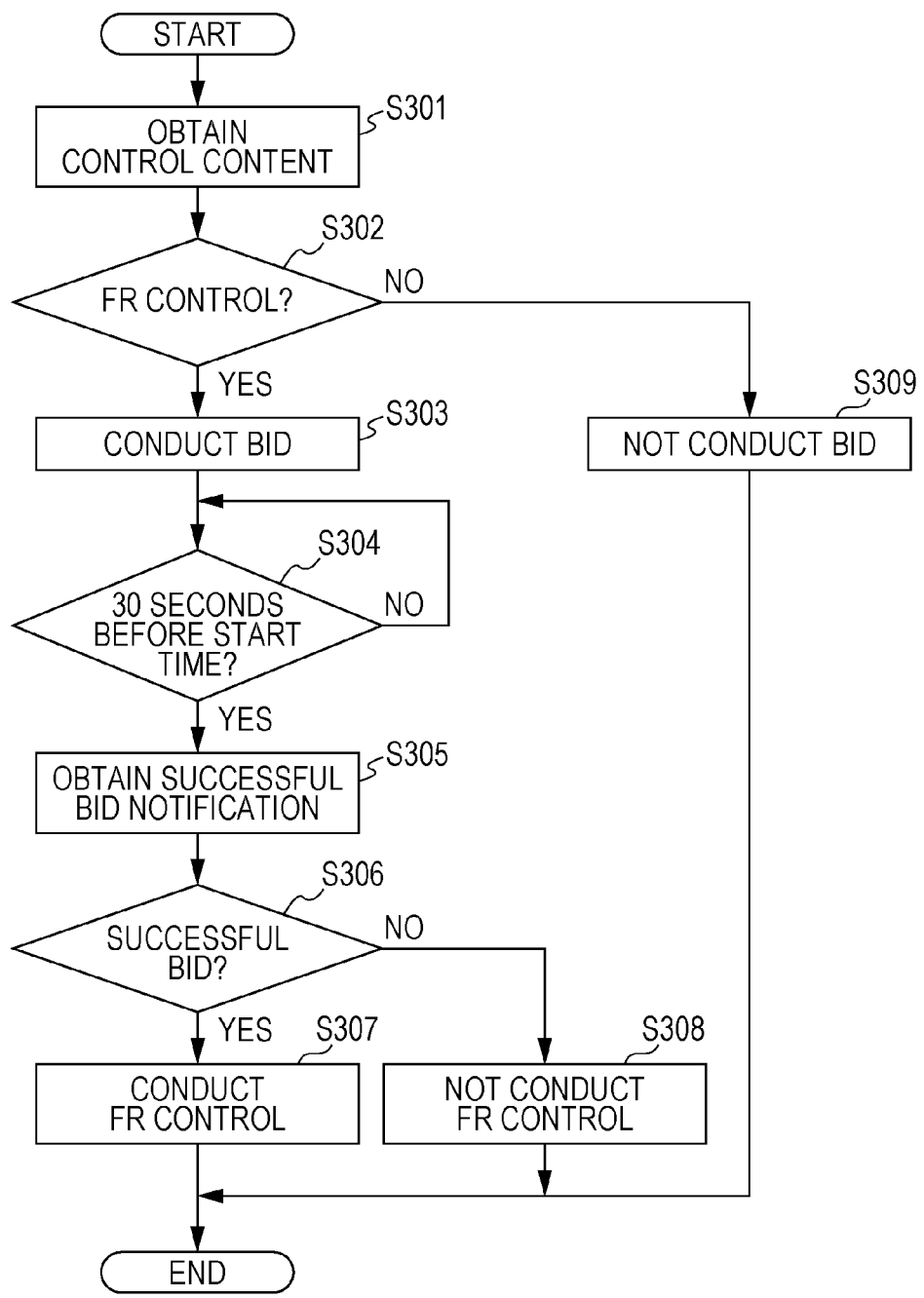
FIG. 11 is a flowchart of an operation of the bid management device.

An operation of the bid management device 340 will next be described. FIG. 11 is a flowchart of the operation of the bid management device 340.

The bid execution unit 341 obtains the control content that is assigned to the time slot from the communication unit 320 of the power storage system management device 300 (S301). The bid execution unit 341 then determines whether or not the obtained control content is the frequency control (S302).

In a case where the obtained control content is the frequency control (Yes in S302), the bid execution unit 341 conducts a bid for the frequency control service to the frequency regulation market (the power market server 400) (S303). Here, the bid execution unit 341 performs the bid for the frequency control that is planned to be conducted in the target time slot to the frequency regulation market after the frequency control is assigned to the target time slot and before a prescribed bid deadline time. A prescribed bid deadline time is 65 minutes before the start time of the target time slot, for example.

For example, 30 seconds before the start time of the target time slot (Yes in S304), the power storage system management device 300 obtains the successful bid notification (bid result) about the target time slot from the bid management device 340 (S305). There may be cases where the bid result is transmitted from the power market server 400 to the bid management device 340 immediately before the bid result is obtained by the power storage system management device 300 and where the bid result is stored in advance in the successful bid notification history 407 in the memory 332. In a case where the bid for the frequency control service is successful (Yes in S306), the frequency control is conducted in the target time slot (S307). In a case where the bid is not successful (No in S306), the frequency control is not conducted in the target time slot (S308).

In a case where the control content obtained in step S302 is not the frequency control (No in S302), the bid execution unit 341 does not conduct a bid for the frequency control service (S309).

The bid execution unit 341 may perform the bid for the frequency control service that is planned to be conducted in the target time slot to the frequency regulation market before the control content is assigned to the target time slot. In this case, in a case where the control content other than the frequency control is assigned to the target time slot after the bid, the bid execution unit 341 cancels the bid by the prescribed bid deadline time.

[Determination Process of Charge Amount]

Figure 12:
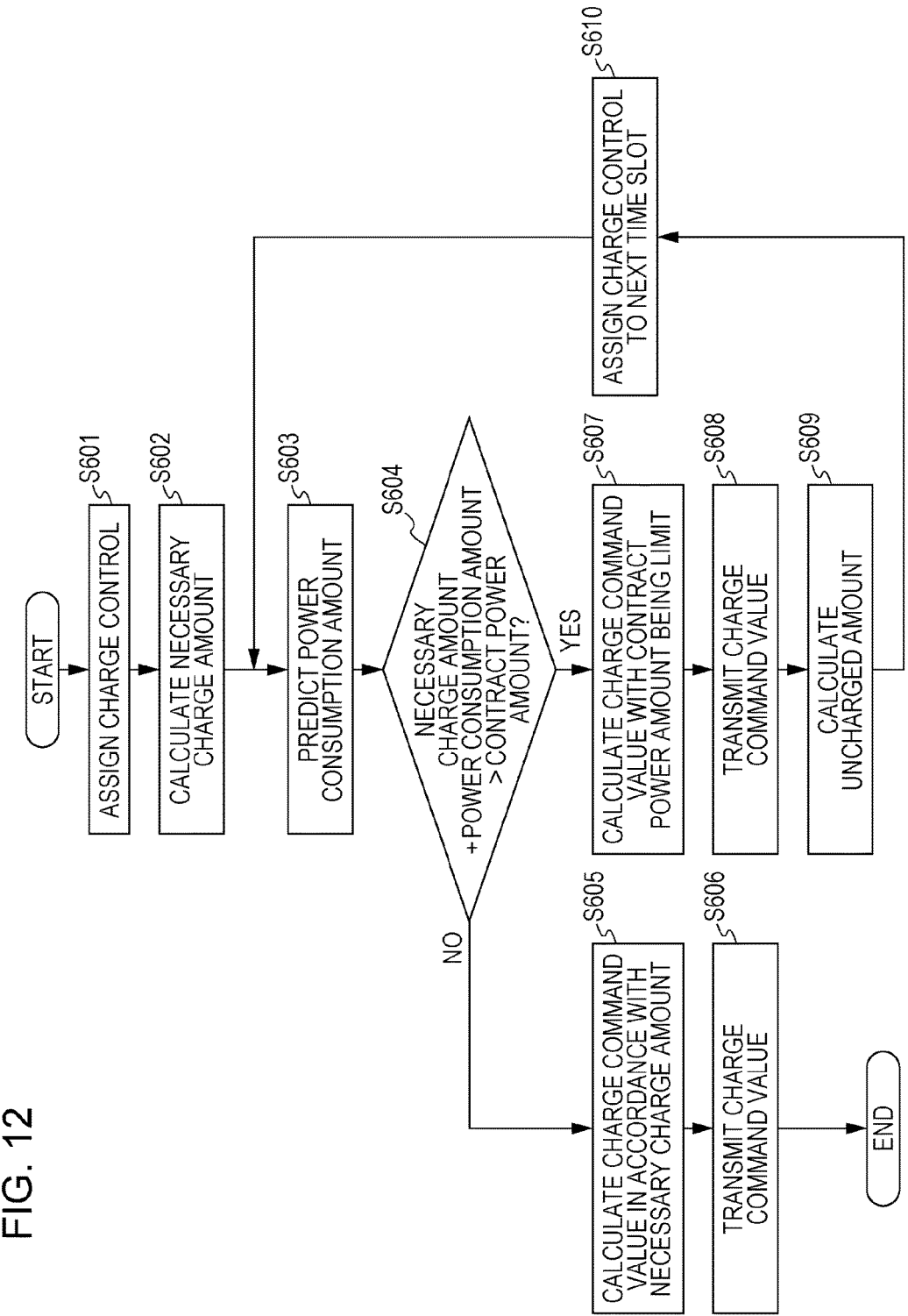
FIG. 12 is a flowchart that illustrates a determination process of a charge amount.

In a case where the charge control is assigned to a target time slot, the power storage system management device 300 also in advance determines the charge amount in the time slot to which the charge control is assigned. A determination method of the charge amount will be described below. FIG. 12 is a flowchart that illustrates the determination process of the charge amount.

In a case where the planning unit 313 assigns the charge control to the target time slot (S601), the charge amount determination unit 316 calculates a necessary charge amount in the target time slot (S602). In a case where the peak shaving is assigned to the time slot prior to the target time slot, the necessary charge amount is calculated based on the discharge amount that is scheduled in the peak shaving and the reference SOC information 402.

The consumption power prediction unit 312 next predicts a consumption power amount (consumption power) in the target time slot (S603). The charge amount determination unit 316 then determines whether or not the value that results from the addition of the necessary charge amount calculated in step S602 and the consumption power amount predicted in step S603 exceeds the prescribed contract power (S604).

In a case where the value that results from the addition of the necessary charge amount and the consumption power amount exceeds the prescribed contract power (Yes in S604), the charge amount determination unit 316 calculates a scheduled charge amount in the target time slot with a prescribed contract power amount (prescribed contract power) being the limit (S607), and the command value generation unit 317 transmits the calculated scheduled charge amount as the command value (S608). The charge amount determination unit 316 then calculates an uncharged amount that is a difference between the necessary charge amount and the scheduled charge amount (S609), and the planning unit 313 assigns the charge control to the next time slot (S610). In the flowchart of FIG. 12, a process of step S610 may be performed immediately after step S604.

In step S604, in a case where the value that results from the addition of the necessary charge amount and the consumption power amount is the prescribed contract power or lower (No in S604), the charge amount determination unit 316 calculates the necessary charge amount as the scheduled charge amount in the target time slot (S605), and the command value generation unit 317 transmits the calculated scheduled charge amount as the command value (S606).

Figure 13:
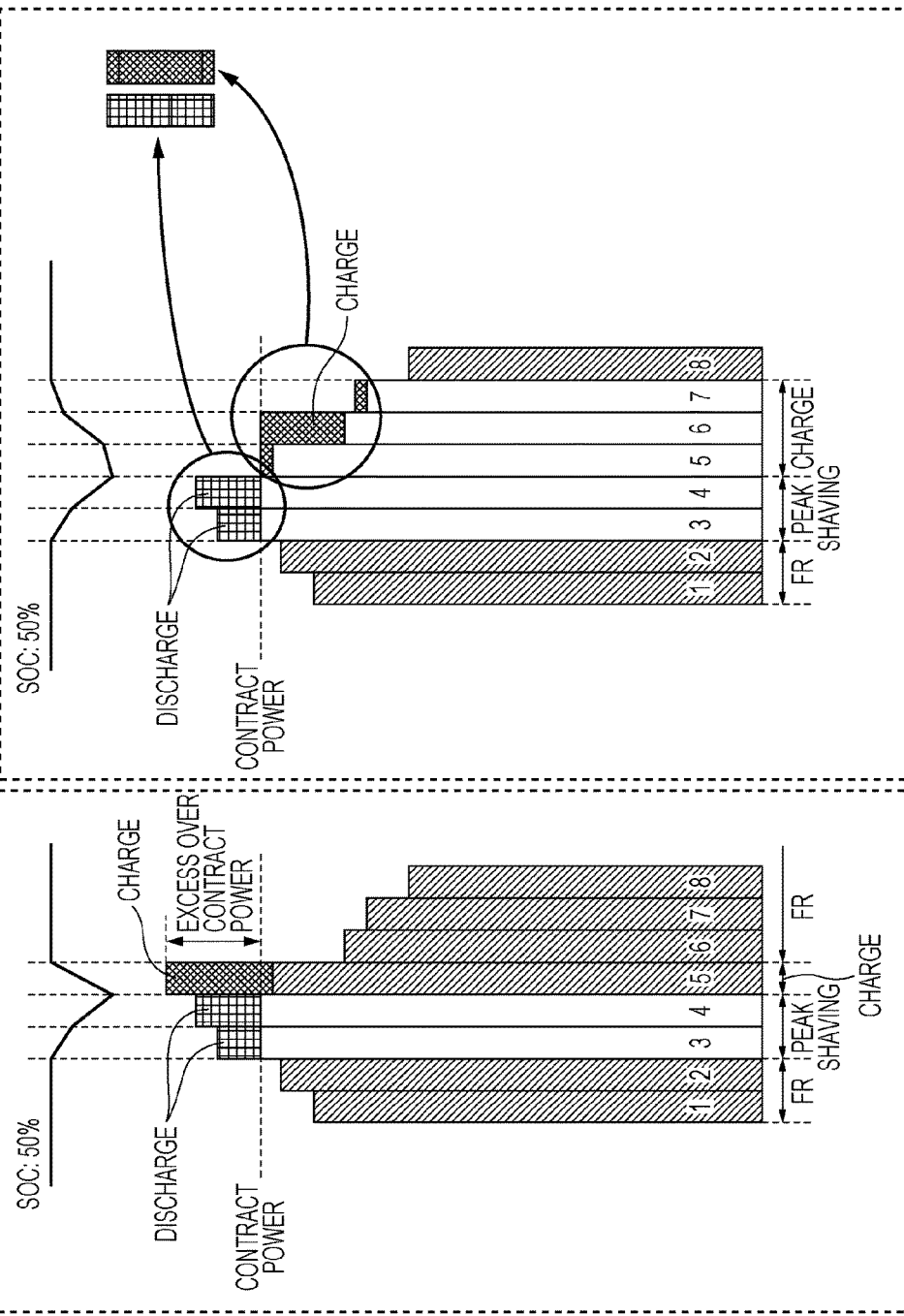
FIGS. 13A and 13B are schematic diagrams that illustrate a first example of the determination process of the charge amount.

Specific examples of the determination process of the charge amount as described above will be described below. FIGS. 13A and 13B are schematic diagrams that illustrate a first example of the determination process of the charge amount. FIGS. 13A and 13B are diagrams that illustrate the relationship among the time slots (time slots 1 to 8), the estimated state of charge (upper side), and the predicted consumption power (lower side).

In the example illustrated in FIG. 13A, an excess amount over the prescribed contract power is scheduled to be supplemented by discharge from the power storage system 200 to the load 100 in the time slots 3 and 4. Here, in the example of FIG. 13A, it is assumed that charge and discharge of the power storage system 200 is performed so that the state of charge of the power storage system 200 falls within the prescribed range (here, the SOC of 50% as an example) at the start time of the time slot to which the frequency control is assigned.

Thus, the necessary charge amount in the time slot 5 is determined to the same power amount as the predicted discharge amount for the time slots 3 and 4.

As illustrated in FIG. 13A, in the time slot 5, if the necessary charge amount is added to the predicted consumption power amount, the consumption power exceeds the prescribed contract power. That is, in the time slot 5 (first charge slot), the charge control is performed within a range in which the consumption power becomes the prescribed contract power or lower, and a determination is thereby made that the state of charge of the power storage system 200 may not be kept within the prescribed range.

Here, the time slot 6 (second charge slot) next to the time slot 5 is the time slot in which the predicted consumption power is the prescribed contract power or lower. In such a case, as illustrated in FIG. 13B, the planning unit 313 first assigns the charge control to the time slot 6.

Then, the scheduled charge amount in the time slot 5 is determined to the power amount (power) that is defined in accordance with the difference between the prescribed contract power and the predicted consumption power. Here, the power amount that is defined in accordance with the difference between the prescribed contract power and the predicted consumption power means the maximum power amount that may be charged in a range of the prescribed contract power or lower in the time slot 5.

In addition, in the examples of FIGS. 13A and 13B, even if the charge control is performed in the time slot 6 within a range where the predicted consumption power becomes the prescribed contract power or lower, a determination is made that the state of charge of the power storage system 200 may not be kept within the prescribed range. In such a case, the planning unit 313 further assigns the charge control to the time slot 7 next to the time slot 6. Then, the scheduled charge amount in the time slot 6 is determined to the power amount (power) that is defined in accordance with the difference between the prescribed contract power and the predicted consumption power.

As a result, as illustrated in FIG. 13B, the discharge amount in the time slots 3 and 4 becomes equivalent to the charge amount in the time slots 5, 6, and 7 in the plan.

The time slot 8 is the time slot in which the predicted consumption power becomes the prescribed contract power or lower, and the estimated state of charge is within the prescribed range at the start time of the time slot 8. Thus, the frequency control is assigned to the time slot 8.

As described above, the planning unit 313 determines the scheduled charge amount in the time slot 5 so that the consumption power in the time slot 5 to which the charge control is assigned becomes the prescribed contract power or lower. That is, the necessary charge amount is carried over to the next time slot until the state of charge of the power storage system 200 becomes within the prescribed range, and the necessary charge amount is allocated to plural time slots. Accordingly, disadvantages that occur due to the consumption power that exceeds the prescribed contract power may be reduced, and the state of charge of the power storage system 200 that affords the frequency control may be achieved. In other words, continuity of the frequency control may be secured.

Figure 14:
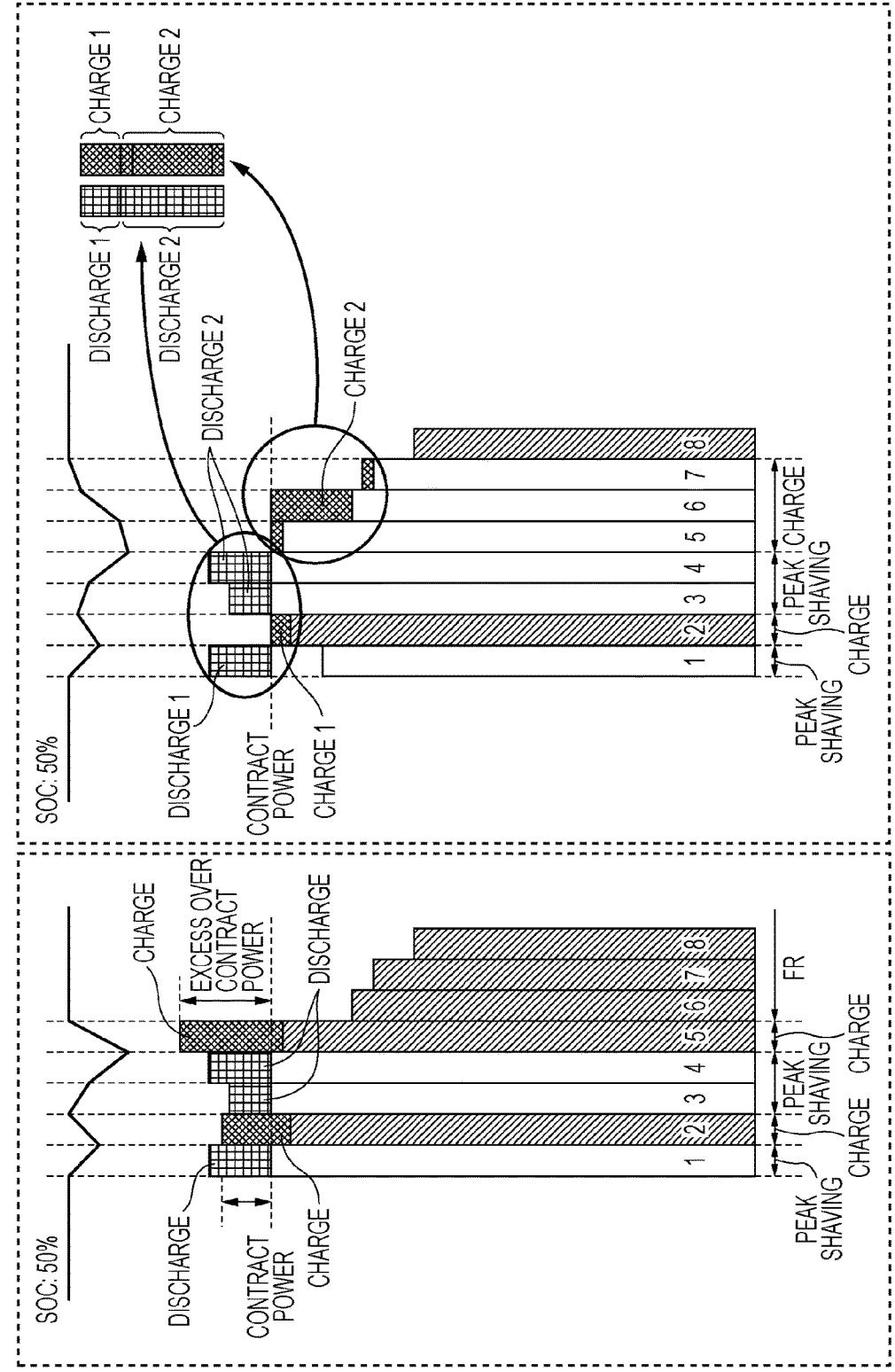
FIGS. 14A and 14B are schematic diagrams that illustrate a second example of the determination process of the charge amount.

The necessary charge amount may be carried over with the time slot, to which the peak shaving is assigned, being interposed. FIGS. 14A and 14B are schematic diagrams that illustrate a second example of the determination process of the charge amount. FIGS. 14A and 14B are diagrams that illustrate the relationship among the time slots (the time slots 1 to 8), the estimated state of charge (upper side), and the predicted consumption power (lower side).

In the examples in FIGS. 14A and 14B, as illustrated in FIG. 14B, the uncharged amount that occurs in the time slot 2 illustrated in FIG. 14A is carried over to the time slot 5 and the later time slots with the time slots 3 and 4, to which the peak shaving is assigned, being interposed. Here, in addition, as illustrated in FIG. 14A, the uncharged amount also occurs in the time slot 5, and the uncharged amount is carried over to the time slots 6 and 7.

The charge amount does not necessarily need to be determined in advance and may be determined when the charge-discharge control of the power storage system 200 is actually performed by the command value generation unit 317.

[Charge-Discharge Control]

A description will next be made about the charge-discharge control that is performed by generation and transmission of the command value by the command value generation unit 317 (the charge-discharge control unit 310). FIGS. 15A to 15C are diagrams for explaining the charge-discharge control of the command value generation unit 317.

Figure 15:
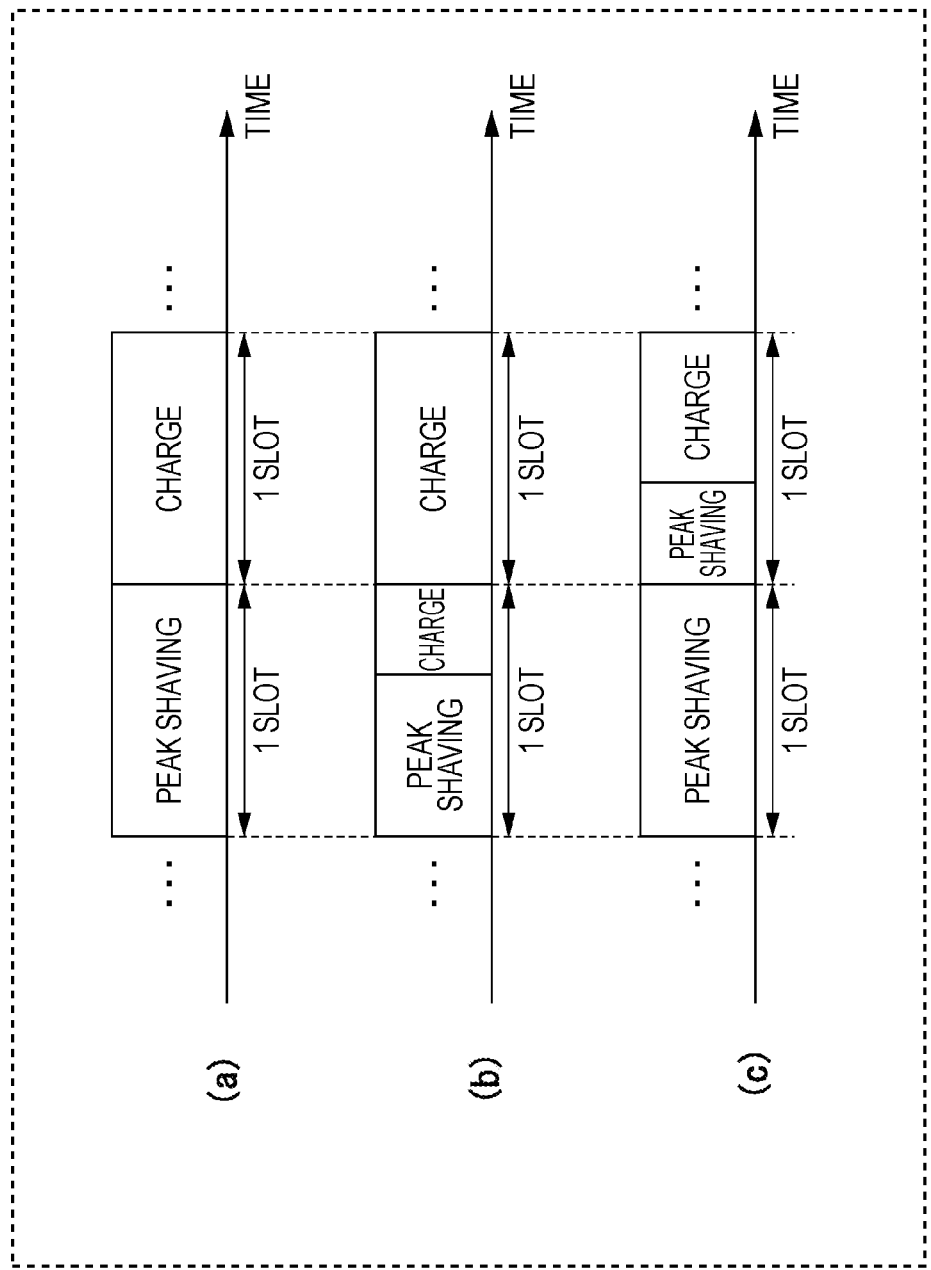
FIG. 15 is a diagram for explaining charge-discharge control of a command value generation unit.

As illustrated in FIG. 15(*a*), in a case where the peak shaving and the charge control are assigned to two time slots, it is assumed that the command value that instructs that the peak shaving is performed as planned is transmitted at the start time of the time slot to which the peak shaving is assigned.

Here, if the peak shaving (discharge of the power storage system 200) is actually started, there is a case where the peak shaving is not necessary any longer during the time slot for a reason that the consumption power of the load 100 is lower than predicted. As described above, although the single time slot is approximately 30 minutes, the command value generation unit 317 may transmit the command value for the peak shaving to the power storage system 200 for each 5 minutes.

Accordingly, in a case where a determination is made that the peak shaving is not necessary while the power storage system 200 is actually operating (a case where actual consumption power of the customer falls within the prescribed contract power), the peak shaving may be canceled, and the charge control may be started as illustrated in FIG. 15(*b*).

On the other hand, if the peak shaving is actually started, there is a case where the peak shaving is necessary for a reason that the consumption power of the load 100 is higher than predicted in the next time slot (the time slot to which the charge control is assigned). In such a case, as illustrated in FIG. 15(*c*), the peak shaving may be performed in the time slot to which the charge control is assigned.

As illustrated in FIGS. 15B and 15C, there may be a case where the peak shaving is executed by performing discharge of the power storage system 200 in the time slot earlier than the time slot to which the charge control is assigned. In such a case, the command value generation unit 317 may generate a command value for charging the same power amount as the discharge amount by the peak shaving in the earlier time slot to the power storage system 200 in the time slot to which the charge control is assigned.

Such control makes the state of charge that is obtained after the charge control is performed become equivalent to the state of charge at a point prior to the peak shaving. Thus, the state of charge may be stabilized within the prescribed range, and the frequency control may thereby be executed continuously.

Further, in a case where the time slots (charge slots) to which the charge control is assigned are provided in series, the command value generation unit 317 generates the command value so that the consumption power is kept to the prescribed contract power or lower in each of the time slots. Specifically, for example, in a case where the second charge slot is assigned to the time slot next to the first charge slot, the difference between the prescribed contract power and the consumption power of the customer is charged to the power storage system in the first charge slot. The power storage system 200 is further charged in the second charge slot in order to keep the state of charge within the prescribed range. This enables avoidance of a case where the consumption power of the customer exceeds the prescribed contract power due to the charge control.

First Modification

Figure 16:
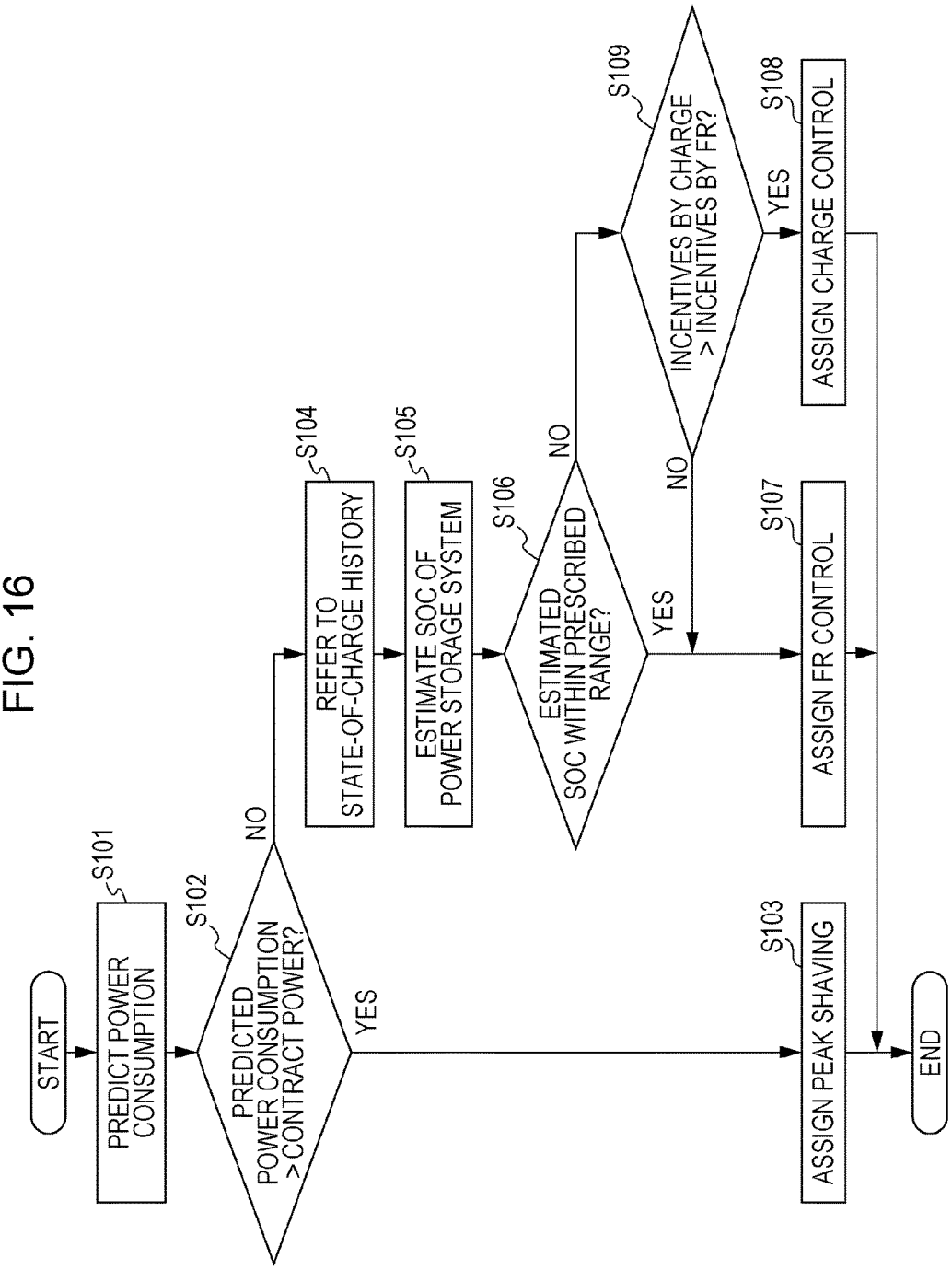
FIG. 16 is a flowchart of an assignment operation of control contents in which incentives are taken into consideration.

Incentives that may be obtained may further be taken into consideration in the above-described assignment operation of the control contents of the power storage system management device 300. FIG. 16 is a flowchart of an assignment operation of the control contents in which incentives are taken into consideration. In the flowchart of FIG. 16, a description will not be made about portions that have the same contents as the flowchart of FIG. 9.

For example, it is assumed that the control content is assigned to the time slot next to the time slot (charge slot) to which the charge control is assigned. In addition, in such a case, it is assumed that the power storage system 200 is charged to the state of charge within the prescribed range in the charge slot and the frequency control may thereby be assigned to the next time slot. However, it is assumed that the power storage system 200 is charged to the state of charge within the prescribed range in the charge slot and, as a result, the consumption power of the customer is predicted to exceed the prescribed contract power in the charge slot.

In such a case, the planning unit 313 may create a plan (first plan) in which the charge amount is reduced so that the consumption power of the customer in the charge slot is lower than the prescribed contract power and the charge control is assigned to the next time slot. On the other hand, the planning unit 313 may create a plan (second plan) in which the power storage system 200 is charged to the state of charge within the prescribed range in the charge slot and the frequency control is assigned to the next time slot.

In the first plan, because the frequency control is not assigned to the next time slot, incentives may not be obtained by the frequency control. On the other hand, in the second plan, because the frequency control is assigned to the next time slot, incentives may be obtained by the frequency control. However, the consumption power exceeds the prescribed contract power in the charge slot. This leads to disadvantages such as an increase in the power rate.

In such a case, the planning unit 313 selects the plan by which higher incentives are obtained. Specifically, as illustrated in FIG. 16, the planning unit 313 first determines whether or not the SOC that is estimated for the start time of the next time slot falls within the prescribed range (S106). Then, in a case where the estimated SOC does not fall within the prescribed range (No in S106), the planning unit 313 assesses the incentives. Specifically, the planning unit 313 determines whether or not the incentives that may be obtained in a case where the charge control is performed within the prescribed contract power in the charge slot and the charge control is assigned to the next time slot are higher than the incentives that may be obtained in a case where the charge control is performed with the consumption power exceeding the prescribed contract power in the charge slot and the frequency control is assigned to the next time slot (S109).

In a case where the incentives that may be obtained in a case where the charge control is assigned to the next time slot are not higher than the incentives that may be obtained in a case where the frequency control is assigned (No in S109), the planning unit 313 assigns the frequency control to the next time slot.

In a case where the incentives that may be obtained in a case where the charge control is assigned to the next time slot are higher than the incentives that may be obtained in a case where the frequency control is assigned (Yes in S109), the planning unit 313 assigns the charge control to the next time slot.

Such an assignment operation of the power storage system management device 300 enables an increase in the incentives that may be obtained.

Second Modification

Figure 17:
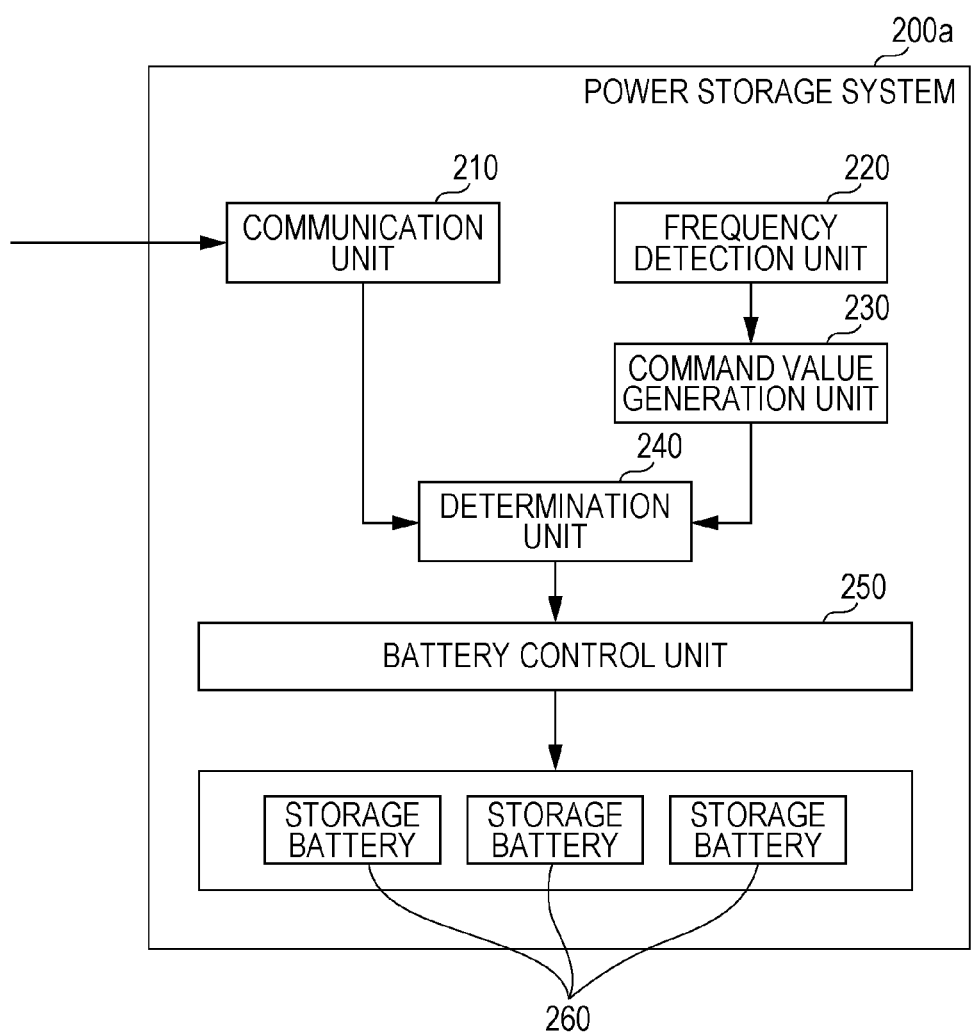
FIG. 17 is a block diagram that illustrates a function configuration of a power storage system that includes the command value generation unit and a frequency detection unit.

The frequency detection unit 318 that is provided in the charge-discharge control unit 310 may be provided in the power storage system 200. FIG. 17 is a block diagram that illustrates a configuration of a power storage system that includes a frequency detection unit.

A power storage system 200a that is illustrated in FIG. 17 includes a communication unit 210, a frequency detection unit 220, a command value generation unit 230, a determination unit 240, a battery control unit 250, and plural storage batteries 260.

The communication unit 210 communicates with the communication unit 320 of the power storage system management device 300. Specifically, the communication unit 210 receives control instructions that include specification flags of the control contents (the frequency control, the peak shaving, and the charge control) and the start times of the control from the power storage system management device 300. The control instructions may include the end times.

The frequency detection unit 220 detects the frequency of the commercial system.

The command value generation unit 230 generates a command value (FR command value) for the frequency control that causes the power storage system 200a to perform charge or discharge in accordance with a detection result of the frequency detection unit 220.

The determination unit 240 determines whether or not charge or discharge of the storage batteries 260 is started based on the control instruction or the like that is received through the communication unit 210. The function of the determination unit 240 may be included in the battery control unit 250.

The battery control unit 250 performs charge or discharge of the storage batteries 260 based on a determination result of the determination unit 240.

Figure 18:
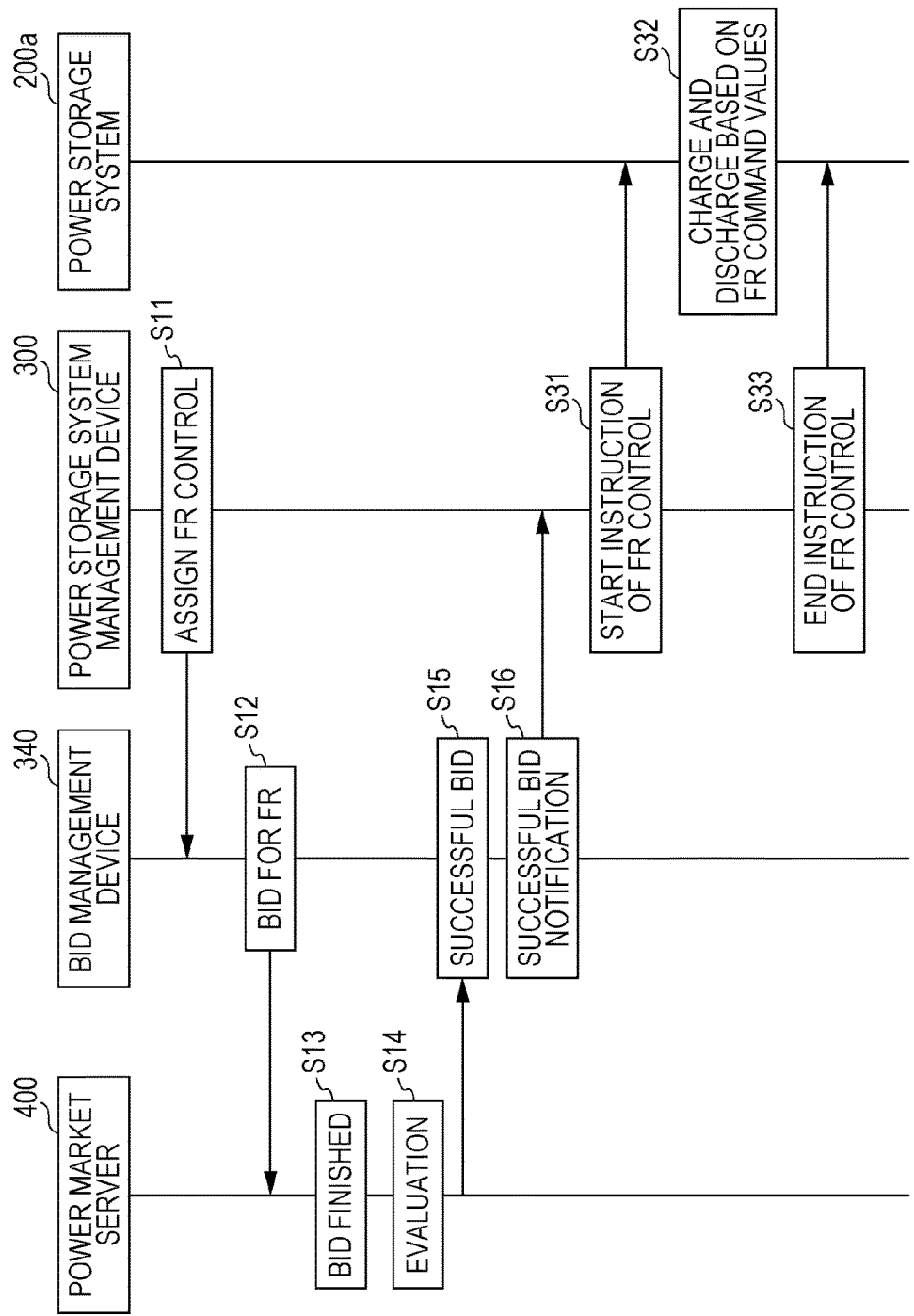
FIG. 18 is a sequence diagram of the frequency control in a case where the power storage system includes the frequency detection unit.

The power storage system 200a is different from the power storage system 200 in a point that the frequency of the commercial system is detected in the frequency control. The frequency control by using the power storage system 200a will be described below. FIG. 18 is a sequence diagram of the frequency control in a case where the power storage system 200a includes the frequency detection unit. The sequence diagram that is illustrated in FIG. 18 is different in steps that correspond to step S17 to S19 in the sequence diagram that is illustrated in FIG. 7, and a description will be made below while focusing on this point.

As illustrated in FIG. 18, in the frequency control by using the power storage system 200a, the power storage system 200a receives not the FR command value but a start instruction of the frequency control from the power storage system management device 300 (S31) and performs the frequency control in accordance with the FR command value generated by the command value generation unit 230 at the start time that is provided by the start instruction (S32). The frequency control is performed until an end instruction of the frequency control is received from the power storage system management device 300 (S33). In a case where the end time is contained in the start instruction (control instruction), an operation of step S33 is omitted.

Figure 19:
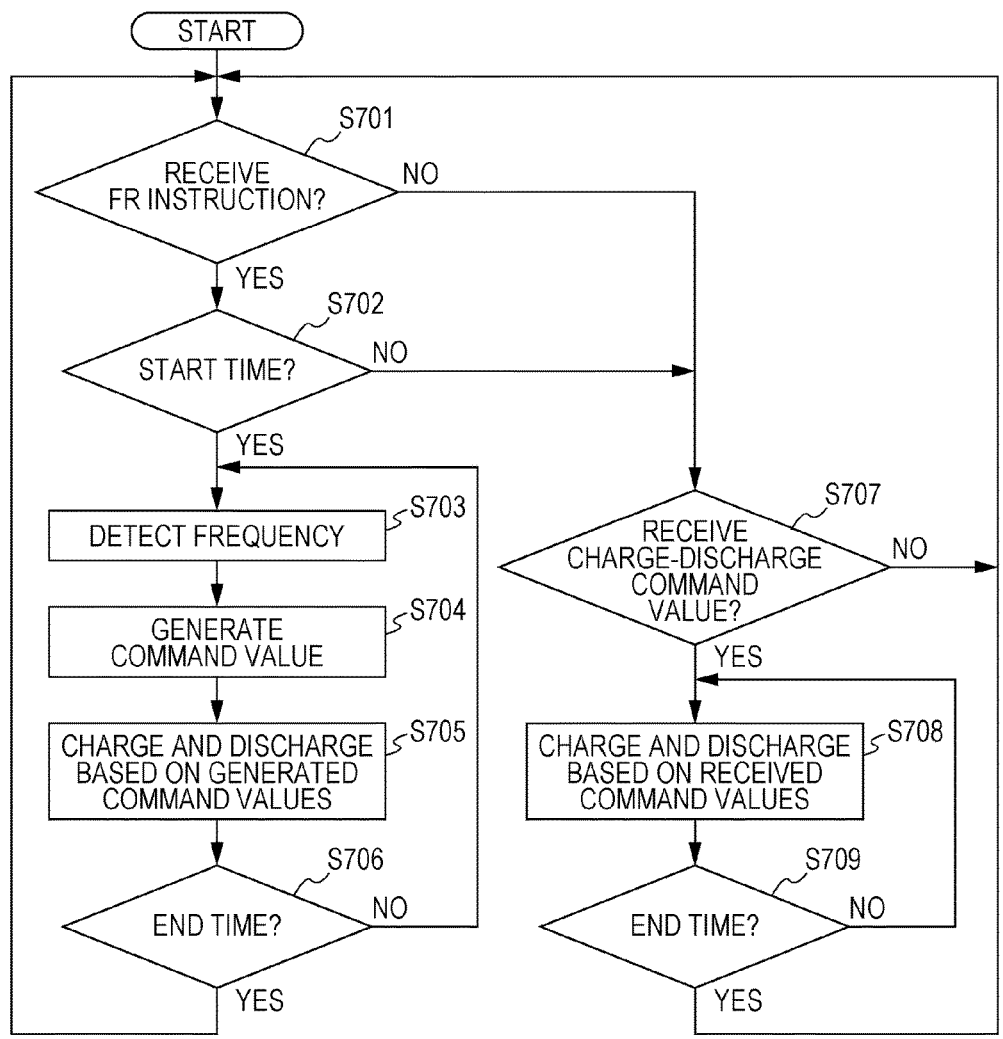
FIG. 19 is a flowchart of an operation of the power storage system according to a second modification.

An operation of the power storage system 200a in the frequency control will next be described in detail. FIG. 19 is a flowchart of the operation of the power storage system 200a.

In a case where the communication unit 210 receives the start instruction (first control signal) of the frequency control from the communication unit 320 of the power storage system management device 300 (Yes in S701), at the start time (Yes in S702), the frequency detection unit 220 detects the frequency of the commercial system (S703), and the command value generation unit 230 generates the FR command value (first power command value) in accordance with the detected frequency (S704). The command value generation unit 230 generates the FR command value for each second, for example (S704). The battery control unit 250 then performs charge or discharge of the storage batteries 260 based on the generated FR command value (S705). The frequency control is performed until the end time (Yes in S706).

In step S701, in a case where the communication unit 210 does not receive the start instruction of the frequency control from the communication unit 320 (No in S701) but receives a charge-discharge command value (a second control signal that contains a second power command value) (Yes in S707), the battery control unit 250 performs charge or discharge of the storage batteries 260 based on the received command value (S708). That is, the power storage system 200a performs the peak shaving or the charge control. The communication unit 320 receives the command value for each five minutes, for example. The peak shaving or the charge control is performed until the end time (Yes in S709).

Here, a detection cycle of the frequency of the frequency detection unit 220 and a generation cycle of the FR command value of the command value generation unit 230 are a short cycle such as each second as described above and is a shorter cycle than a reception cycle of the charge-discharge command value.

The frequency detection unit 220 may continuously detect the frequency of the commercial system and may generate the FR command value only in a case where the start instruction of the frequency control is received.

Other Embodiments

As described above, the technology to be disclosed in the present disclosure is exemplified in the first embodiment. However, the technology in the present disclosure is not limited thereto and may be applied to embodiments in which appropriate modification, substitution, addition, omission, and so forth are made. Further, another embodiment may be made by combining the elements described in the first embodiment.

For example, the embodiment is described with an example where power storage system management device 300 causes the power storage system 200 to perform discharge in the peak shaving. However, the power storage system management device 300 may block (stop) the load 100 in the peak shaving. In this case, the power storage system management device 300 blocks the load 100 via another control device (for example, a HEMS controller or the like).

Further, it is assumed that the consumption power is predicted to exceed the prescribed contract power in a case where the power storage system 200 is charged to the state of charge within the prescribed range in the time slot to which the charge control is assigned. In such a case, the power storage system management device 300 may block the load 100 in order to give priority to the power storage system 200. That is, surplus power that results from the blocking of the load 100 may be provided to charge of the power storage system 200.

In the embodiments, the elements may be realized by configuring those with dedicated hardware or by executing software programs that are suitable for the elements. A program execution unit such as a CPU or a processor reads out and executes software programs that are recorded in a recording medium such as a hard disk or a semiconductor memory, and the elements may thereby be realized.

In the foregoing, a description has been made about a supply and demand control device (power storage system management device), a supply and demand control method, and a power storage system according to one or plural aspects based on the embodiments. However, the present disclosure is not limited to the embodiments. Modes in which various kinds of modifications conceived by persons having ordinary skill in the art are applied to this embodiment and modes that are configured by combining elements in different embodiments may be included in the scope of the one or plural aspects unless the modes depart from the gist of the present disclosure.

For example, in the embodiments, a process that is executed by a particular processing unit may be executed by another processing unit. Further, orders of plural processes may be changed, or plural processes may simultaneously be executed.

The present disclosure is useful as a supply and demand control method in which frequency control that controls a frequency of a power system to a specific range by performing charge and discharge of a power storage system and peak shaving that reduces consumption power by a customer are efficiently and easily conducted.

What is claimed is:

1. A power supply and demand control method of a power storage system that includes a storage battery and receives power from a commercial system based on a contract power, the method comprising:

predicting a consumption power of a customer for each of time slots divided by a specific time interval;

assigning one of a frequency control and a peak shaving control to each of the time slots based on the predicted consumption power; and controlling the storage battery based on the assigned frequency control or the assigned peak shaving control in each of the time slots, wherein the peak shaving control is assigned to each of the time slots in which the predicted consumption power is higher than the contract power, and the frequency control is assigned to each of the time slots in which the predicted consumption power is equal to or lower than the contract power, wherein, in each of the time slots to which the frequency control is assigned, charging and discharging of the storage battery are alternately performed during time periods shorter than the specific time interval of the time slots, to keep an alternate current frequency of the commercial system within a predetermined range.

2. The power supply and demand control method according to claim 1, further comprising:

performing a bid for the frequency control in a time slot, before a bid deadline.

3. The power supply and demand control method according to claim 2, further comprising:

cancelling the bid by the bid deadline in a case where the peak shaving control is assigned to the time slot.

4. The power supply and demand control method according to claim 1, further comprising:

estimating a state of charge of the power storage system in each of the time slots, wherein the frequency control is assigned to each of the time slots in which the predicted power consumption is equal to or lower than the contract power and the estimated state of charge is within a prescribed range, and a charge control is assigned to each of the time slots in which the predicted power consumption is equal to or lower than the contract power and the estimated state of charge is lower than a prescribed range.

5. The power supply and demand control method according to claim 4, wherein a charge amount in the time slots to which the charge control is assigned, is equal to or higher than a difference between the consumption power and the contract power in the time slots.

6. The power supply and demand control method according to claim 5, wherein, in a case where the state of charge is not kept within the prescribed range by using power within a range of the contract power in a time slot to which the charge control is assigned, the charge control is successively assigned to each of later time slots until the state of charge becomes within the prescribed range.

7. The power supply and demand control method according to claim 6, wherein, in a case where the consumption power in a next time slot is predicted to become equal to or lower than the contract power, the frequency control is assigned to the next time slot.

8. The power supply and demand control method according to claim 4, wherein, in a case where the peak shaving control is performed in earlier time slots, a power amount that is equivalent to a discharge amount of the peak shaving control in the earlier time slots is charged to the power storage system by using one or more time slots to which the charge control is assigned.

9. The power supply and demand control method according to claim 4,
wherein, in a case where the peak shaving control is assigned to a time slot and the peak shaving control is completed by an end time of the time slot, the charge control of the power storage system is started in a period of the time slot.

10. The power supply and demand control method according to claim 4,
wherein, in a case where the peak shaving control is not completed by using earlier time slots than the time slots to which the charge control is assigned, the peak shaving control is continued by using one or more time slots to which the charge control is assigned, and the peak shaving control is switched to the charge control when the peak shaving control is completed.

11. The power supply and demand control method according to claim 4,
wherein, charge and discharge of the power storage system is performed by using one or more time slots to which the charge control is assigned, to make the state of charge of the power storage system within the prescribed range at a start time of a time slot to which the frequency control is assigned.

12. The power supply and demand control method according to claim 4,
wherein, in a case where the consumption power of the customer is predicted to exceed the contract power, in the time slots to which the charge control is assigned, by performing charge until the state of charge of the power storage system becomes within the prescribed range, a load that belongs to the customer is stopped.

13. The power supply and demand control method according to claim 12,
wherein the peak shaving control is performed in a time slot to which the peak shaving control is assigned, by supplying power from the power storage system to the load that belongs to the customer, and by reducing or stopping the load that belongs to the customer.

14. The power supply and demand control method according to claim 4,
wherein, in a case where the consumption power of the customer is predicted to exceed the contract power, in the time slots to which the charge control is assigned, by performing charge until the state of charge of the power storage system becomes within the prescribed range, a plan in which a higher incentive is obtained is selected from:
(i) a plan in which a charge amount is reduced so that the consumption power of the customer in the time slots to which the charge control is assigned, is lower than the contract power and the charge control is assigned to a next time slot, and
(ii) a plan in which charge is performed in the time slots to which the charge control is assigned, until the state of charge of the power storage system becomes within the prescribed range and the frequency control is assigned to the next time slot.

15. A power supply and demand control device of a power storage system that includes a storage battery and receives power from a commercial system based on a contract power, the device comprising:
one or more memories; and
circuitry operative to:
predict a consumption power of a customer for each of time slots divided by a specific time interval;
assign one of a frequency control and a peak shaving control to each of the time slots based on the predicted consumption power; and
control the storage battery based on the assigned frequency control or the assigned peak shaving control in each of the time slots,
wherein the peak shaving control is assigned to each of the time slots in which the predicted consumption power is higher than the contract power, and the frequency control is assigned to each of the time slots in which the predicted consumption power is equal to or lower than the contract power,
wherein, in each of the time slots to which the frequency control is assigned, charging and discharging of the storage battery are alternately performed during time periods shorter than the specific time interval of the time slots, to keep an alternate current frequency of the commercial system within a predetermined range.

* * * * *